(12) United States Patent  
Amiya et al.

(10) Patent No.: US 9,069,461 B2
(45) Date of Patent: Jun. 30, 2015

(54) DISPLAY SYSTEM INCLUDING FIRST AND SECOND DISPLAY DEVICES

(71) Applicants: Koichi Amiya, Chiyoda-ku (JP); Takatsugu Kuno, Tokyo (JP); Hiroshi Iwamoto, Chiyoda-ku (JP); Hiroshi Murakami, Chiyoda-ku (JP); Yusaku Tanaka, Chiyoda-ku (JP); Kenichi Sawada, Chiyoda-ku (JP)

(72) Inventors: Koichi Amiya, Chiyoda-ku (JP); Takatsugu Kuno, Tokyo (JP); Hiroshi Iwamoto, Chiyoda-ku (JP); Hiroshi Murakami, Chiyoda-ku (JP); Yusaku Tanaka, Chiyoda-ku (JP); Kenichi Sawada, Chiyoda-ku (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 127 days.

(21) Appl. No.: 13/655,846

(22) Filed: Oct. 19, 2012

(65) Prior Publication Data

US 2013/0100497 A1 Apr. 25, 2013

(30) Foreign Application Priority Data

Oct. 20, 2011 (JP) ................................. 2011-231116

(51) Int. Cl.
*G09G 5/00* (2006.01)
*G09G 5/10* (2006.01)
(Continued)

(52) U.S. Cl.
CPC .......... *G06F 3/04883* (2013.01); *G06F 3/1454* (2013.01); *G09G 5/34* (2013.01); *G09G 2340/02* (2013.01); *G09G 2340/0407* (2013.01); *G09G 2350/00* (2013.01); *G09G 2370/022* (2013.01)

(58) Field of Classification Search
USPC ......... 345/581, 654, 659, 690, 547–548, 173, 345/1.1, 1.2, 3.4; 348/14.02, 14.03, 14.12; 370/278, 282, 135–136, 346; 455/3.01, 455/39, 418, 500, 73, 91
See application file for complete search history.

(56) References Cited

U.S. PATENT DOCUMENTS 5,825,336 A 10/1998 Fujita et al.
2008/0013504 A1* 1/2008 Nishibayashi et al. ....... 370/338
(Continued)

FOREIGN PATENT DOCUMENTS

CN 101587396 A 11/2009
CN 101753878 A 6/2010
(Continued)

OTHER PUBLICATIONS

Office Action (Notification of Reasons for Refusal) issued on Nov. 19, 2013, by the Japan Patent Office in corresponding Japanese Patent Application No. 2011-231116, and an English Translation of the Office Action (11 pages).
(Continued)

*Primary Examiner* — Wesner Sajous
(74) *Attorney, Agent, or Firm* — Buchanan Ingersoll & Rooney PC

(57) ABSTRACT

A display system includes an image forming apparatus for storing screen data and a portable information terminal for displaying a screen based on the screen data stored by the image forming apparatus. The display system accepts flick operation for requesting movement of a screen at the portable communication terminal and transmits flick information concerning the flick operation to the image forming apparatus. The display system successively transmits screen data of screens from the start of movement to completion of movement from the image forming apparatus to the portable communication terminal, based on the flick information. The display system displays a screen based on the transmitted screen data on the portable communication terminal.

20 Claims, 28 Drawing Sheets

(51) Int. Cl.
*H04N 7/14* (2006.01)
*H04B 7/005* (2006.01)
*G06F 3/0488* (2013.01)
*G06F 3/14* (2006.01)
*G09G 5/34* (2006.01)

(56) References Cited

U.S. PATENT DOCUMENTS

| | | |
|---|---|---|
| 2009/0289906 A1 | 11/2009 | Hung |
| 2011/0029891 A1 | 2/2011 | Kim et al. |
| 2011/0181683 A1* | 7/2011 | Nam .......................... 348/14.07 |
| 2012/0092351 A1* | 4/2012 | Barnes ........................ 345/505 |
| 2012/0198480 A1* | 8/2012 | Yasaki et al. .................. 719/319 |

FOREIGN PATENT DOCUMENTS

| | | |
|---|---|---|
| CN | 101924823 A | 12/2010 |
| CN | 102143235 A | 8/2011 |
| JP | 05-119955 A | 5/1993 |
| JP | 09-022339 A | 1/1997 |
| JP | 2000-029448 A | 1/2000 |
| JP | 2001-92582 A | 4/2001 |
| JP | 2003-091479 A | 3/2003 |
| JP | 2005-135047 A | 5/2005 |
| JP | 2005-204212 A | 7/2005 |
| JP | 2008-219351 A | 9/2008 |

OTHER PUBLICATIONS

Office Action (Notice of Allowance) issued on Feb. 4, 2014, by the Japan Patent Office in corresponding Japanese Patent Application No. 2011-231116, and an English Translation of the Office Action (5 pages).

Chinese Office Action mailed Sep. 3, 2014, in corresponding Chinese Patent Application No. 201210389076.5, with complete English translation.

* cited by examiner

DISPLAY SYSTEM INCLUDING FIRST AND SECOND DISPLAY DEVICES

This application is based on Japanese Patent Application No. 2011-231116 filed with the Japan Patent Office on Oct. 20, 2011, the entire content of which is hereby incorporated by reference.

BACKGROUND OF THE INVENTION

1. Field of the Invention

The present invention relates to a display system and more particularly to a display system including a first display device for storing screen data and a second display device for displaying a screen based on the screen data stored by the first display device.

2. Description of the Related Art

In recent years, portable communication terminals have been more and more sophisticated, and people own portable communication terminals in place of PCs (Personal Computers). Portable communication terminals allow documents in electronic form to be viewed and edited at any place. Portable communication terminals are used in various business and daily life situations.

With sophistication of portable communication terminals, cooperation between an image forming apparatus and a portable communication terminal has been requested in a display system including an image forming apparatus having a main unit panel (operation panel) and a portable communication terminal having a remote panel. Specifically, it is requested that, for example, the same screen as the screen displayed on the main unit panel be displayed on the remote panel as well.

When the same screen as the screen on a main unit panel is displayed on a remote panel, conventionally, a portable communication terminal acquires screen data to be displayed on a main unit panel that is stored, for example, in a RAM (Random Access Memory) of an image forming apparatus, and displays a screen on a remote panel based on the acquired screen data. When an operation of changing a still image screen displayed on the remote panel is accepted from the user, data of the changed screen is acquired from the image forming apparatus every time a change is made.

The technique of displaying a screen of a display source at another terminal is disclosed, for example, in Document 1 below. Document 1 discloses a communication apparatus including a storage unit for storing performance of a transmission-destination device and a moving image generation unit for generating moving images by morphing. This communication apparatus determines the number of images to be generated by morphing and the data quantity for each image in accordance with the performance of the transmission-destination device. The communication apparatus determines the number of images and the data quantity in accordance with a receiving speed of the transmission-destination device.

Document 1: Japanese Laid-Open Patent Publication No. 2005-135047

Some portable communication terminals can accept operation by gesture, such as flick operation. In the portable communication terminals of this type, more direct and more intuitive operation is possible. However, with the conventional technique, when flick operation is performed at a portable communication terminal, an image forming apparatus cannot handle the flick operation, and the portable communication terminal thus cannot display a screen as desired by the user. This is inconvenient for users.

This is not only the problem between an image forming apparatus and a portable communication terminal and is a common problem to a display system including a first display device for storing screen data and a second display device for displaying a screen based on the screen data stored by the first display device.

SUMMARY OF THE INVENTION

An object of the present invention is to provide a display device capable of improving the user's convenience.

According to an aspect of the present invention, a display system includes a first display device for storing screen data and a second display device for displaying a screen based on the screen data stored by the first display device. The display system includes: an operation accepting unit for accepting flick operation for requesting movement of a screen at the second display device; a first transmission unit for transmitting flick information concerning the flick operation accepted by the operation accepting unit to the first display device; a second transmission unit for successively transmitting screen data of screens from start of movement to completion of movement from the first display device to the second display device, based on the flick information; and a first display unit for displaying a screen based on the screen data transmitted by the second transmission unit on the second display device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below based on the figures.

A display system in the following embodiments includes a first display device for storing screen data and a second display device for displaying a screen based on the screen data stored by the first display device. In the following embodiments, an image forming apparatus is the first display device, and a portable communication terminal capable of wired or wireless communication with the image forming apparatus is the second display device.

In the following embodiments, "flick operation" means an operation of sliding the operating finger or operating tool touching a touch panel in a given direction, with the operating finger or tool kept touching the touch panel.

First Embodiment

First of all, a configuration of a display system in the present embodiment will be described.

Figure 1:
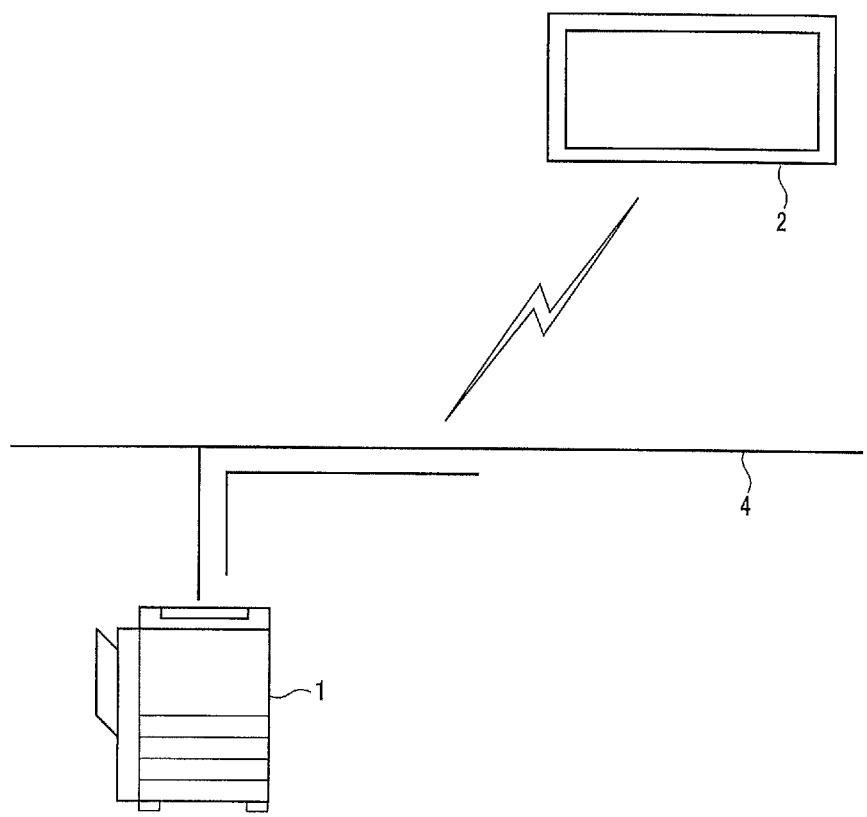
FIG. 1 is a diagram schematically showing a configuration of a display system in a first embodiment of the present invention.

Referring to FIG. 1, a display system includes an image forming apparatus 1 and a portable communication terminal 2. The image forming apparatus 1 is, for example, an MFP (Multi-Functional Peripheral) having a scanner function, a facsimile function, a copy function, a printer function, a data communication function, and a server function. Image forming apparatus 1 is connected with an external device (not shown) and portable communication terminal 2 via a network 4.

Network 4 is, for example, a wired or wireless LAN (Local Area Network) or any other network using a dedicated line. Network 4 connects various kinds of devices using a protocol such as TCP/IP (Transmission Control Protocol/Internet Protocol). The devices connected to network 4 can exchange data with each other. Network 4 may be a network using a public line or using radio communication.

Image forming apparatus 1 forms, for example, a scanned document image or a copy image of an image generated based on print data received from an external device or portable communication terminal 2, on paper. Print data is obtained by, for example, a printer driver converting an imaging instruction issued by an operating system or an application program of an external device or portable communication terminal 2 into a page description language that can be processed by image forming apparatus 1. Print data may be document data written in a file format such as PDF, TIFF, JPEG, or XPS.

Image forming apparatus 1 can transmit a document image to an external device or portable communication terminal 2 via network 4. Image forming apparatus 1 can accumulate document data received from an external device or portable communication terminal 2 into a fixed memory in image forming apparatus 1.

Portable communication terminal 2 can transmit/receive data to/from image forming apparatus 1 via wireless or wired communication (preferably, wireless communication). Portable communication terminal 2 is a portable computer mainly including a CPU (Central Processing Unit), a RAM, a fixed memory, a monitor, and an LCD (Liquid Crystal Display) panel capable of touch operation.

The display system may have a configuration different from that of FIG. 1. The display system may be configured to include, for example, an image forming apparatus that stores screen data but does not include an operation panel, and a display device that displays a screen based on the screen data stored by the image forming apparatus via wireless communication. The image forming apparatus forms an image, for example, using an electrophotographic technique or an electrostatic recording technique. Examples of the image forming apparatus include an MFP, a facsimile machine, a copier, and a printer. The first display device may be an operation panel fixed on an image forming apparatus or may be an operation panel that can be removably attached to a portable communication terminal or an image forming apparatus and can wirelessly communicate with the image forming apparatus. The second display device may be a portable communication terminal or may be an operation panel fixed to the image forming apparatus or an operation panel that can be removably attached to an image forming apparatus.

Figure 2:
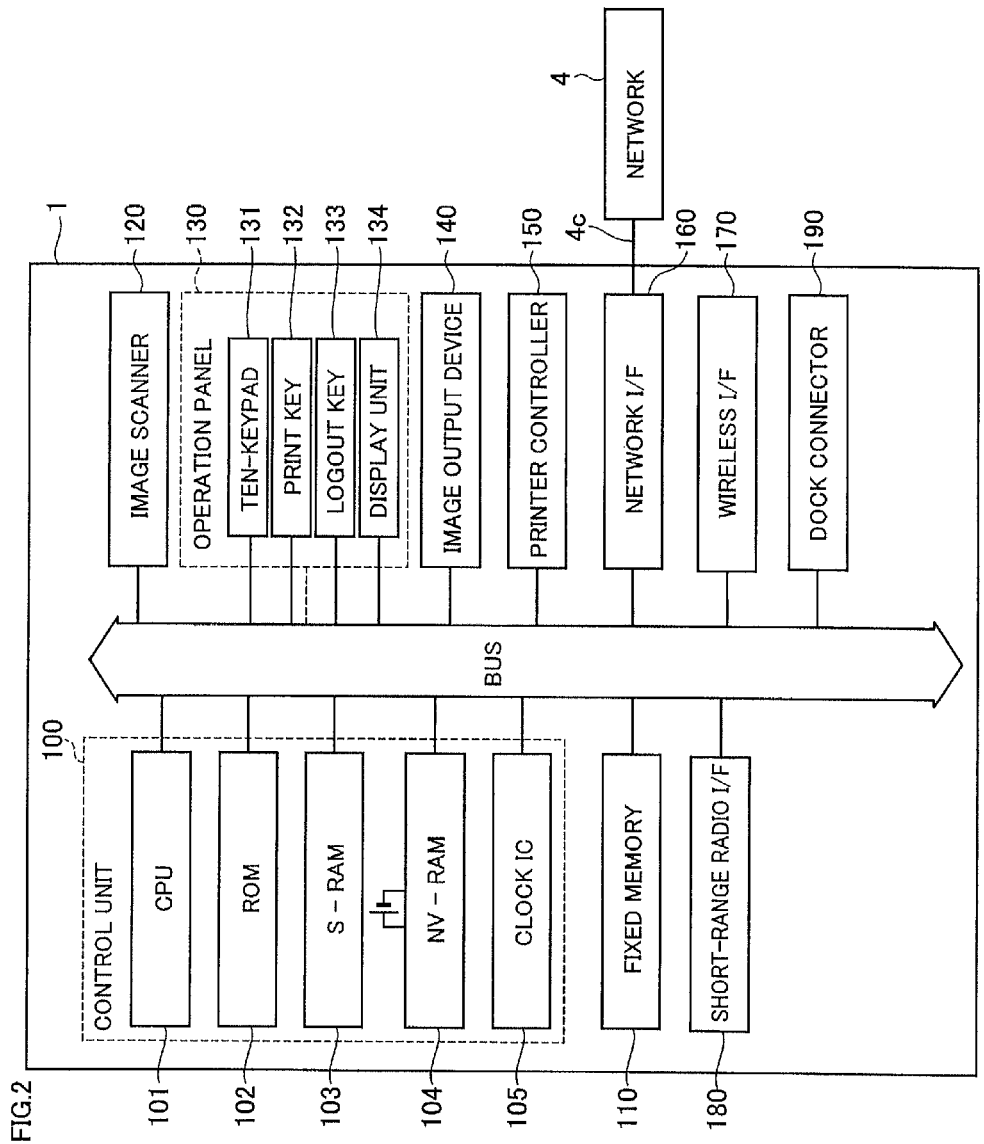
FIG. 2 is a block diagram showing an internal configuration of an image forming apparatus 1.

FIG. 2 is a block diagram showing an internal configuration of image forming apparatus 1.

Referring to FIG. 2, image forming apparatus 1 includes a CPU 101, a ROM (Read Only Memory) 102, an SRAM (Static Random Access Memory) 103, an NVRAM (Non Volatile Random Access Memory, a nonvolatile memory) 104, a clock IC (Integrated Circuit) 105, a fixed memory 110, an image scanner 120, an operation panel 130, an image output device 140, a printer controller 150, a network I/F 160, a wireless I/F 170, a short-range radio I/F 180, and a dock connector 190.

ROM 102, SRAM 103, NVRAM 104, and clock IC 105 are each connected to CPU 101 through a bus. CPU 101, ROM 102, SRAM 103, NVRAM 104, and clock IC 105 constitute a control unit 100. ROM 102 stores a control program for controlling operation of image forming apparatus 1. SRAM 103 is a working memory of CPU 101. NVRAM 104 is battery-backed up and stores settings concerning image forming.

Fixed memory 110, image scanner 120, operation panel 130, image output device 140, printer controller 150, network I/F 160, and wireless I/F 170 are each connected to control unit 100 through a bus. Fixed memory 110 is, for example, a hard disk device and stores screen data of a screen to be displayed on operation panel 130 and portable communication terminal 2. Image scanner 120 scans a document image. Operation panel 130 includes ten-keypad 131 for inputting numerals, a print key 132 accepting an instruction to execute print, a logout key 133 accepting an instruction to logout from the user, a display unit 134 displaying a variety of information, and the like. Image forming apparatus 1 is a kind of a display device because operation panel 130 includes display unit 134. Image output device 140 forms a copy image on paper. Printer controller 150 generates a copy image from print data received by network I/F 160. Network I/F 160 connects image forming apparatus 1 to network 4 through a network cable 4c. Network I/F 160 transmits/receives a variety of information to/from an external device or portable information terminal 2. Wireless I/F 170 performs wireless communication with an external device or portable communication terminal 2.

Short-range radio I/F 180 and dock connector 190 are each additionally connected to control unit 100. Short-range radio I/F 180 is, for example, Bluetooth® or IrDA® and is mainly used in communication with portable communication terminal 2. Short-range radio I/F 180 may be arranged, for example, at a paper output unit for outputting printed paper, in the vicinity of operation panel 130, or at a portion opposite to the paper output unit. Portable communication terminal 2 is attached to dock connector 190. Image forming apparatus 1 transmits/receives data to/from portable communication terminal 2 through dock connector 190.

Figure 3:
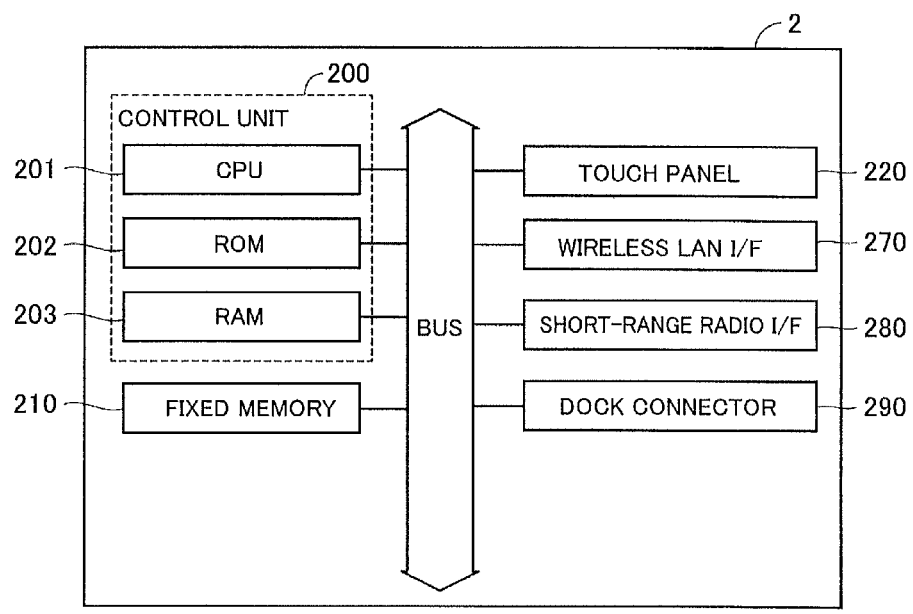
FIG. 3 is a block diagram showing an internal configuration of a portable communication terminal 2.

FIG. 3 is a block diagram showing an internal configuration of portable communication terminal 2.

Referring to FIG. 3, portable communication terminal 2 includes a CPU 201, a ROM 202, a RAM 203, a fixed memory 210, a touch panel 220, a wireless LAN I/F 270, a short-range radio I/F 280, and a dock connector 290. ROM 202 and RAM 203 are each connected to CPU 201. CPU 201, ROM 202, and RAM 203 constitute a control unit 200. ROM 202 stores a control program for controlling operation of portable communication terminal 2. RAM 203 is a working memory of CPU 201.

Fixed memory 210, touch panel 220, wireless LAN I/F 270, short-range radio I/F 280, and dock connector 290 are each connected to control unit 200 through a bus. Fixed memory 210 is, for example, a hard disk device and stores, for example, a variety of information including the number of pixels and size of touch panel 220. Touch panel 220 displays a variety of information and accepts operation input by the user directly touching the screen. Wireless LAN I/F 270 performs radio communication with image forming apparatus 1 and the like. Short-range radio I/F 280 is, for example, Bluetooth® or IrDA® and is mainly used in communication with image forming apparatus 1. Dock connector 290 is used when portable communication terminal 2 is attached to image forming apparatus 1. Portable communication terminal 2 transmits/receives a variety of data to/from image forming apparatus 1 through dock connector 290.

Portable communication terminal 2 is connected by wire with image forming apparatus 1 and becomes ready for communication, for example, when dock connector 290 is attached to dock connector 190 of image forming apparatus 1. Portable communication terminal 2 is wirelessly connected with image forming apparatus 1 and becomes ready for communication, for example, when it is in an area where it can wirelessly communicate with image forming apparatus 1 through short-range radio I/Fs 180 and 280.

Next, the operation of the display system in a case where portable communication terminal 2 accepts flick operation will be described.

Figure 4:
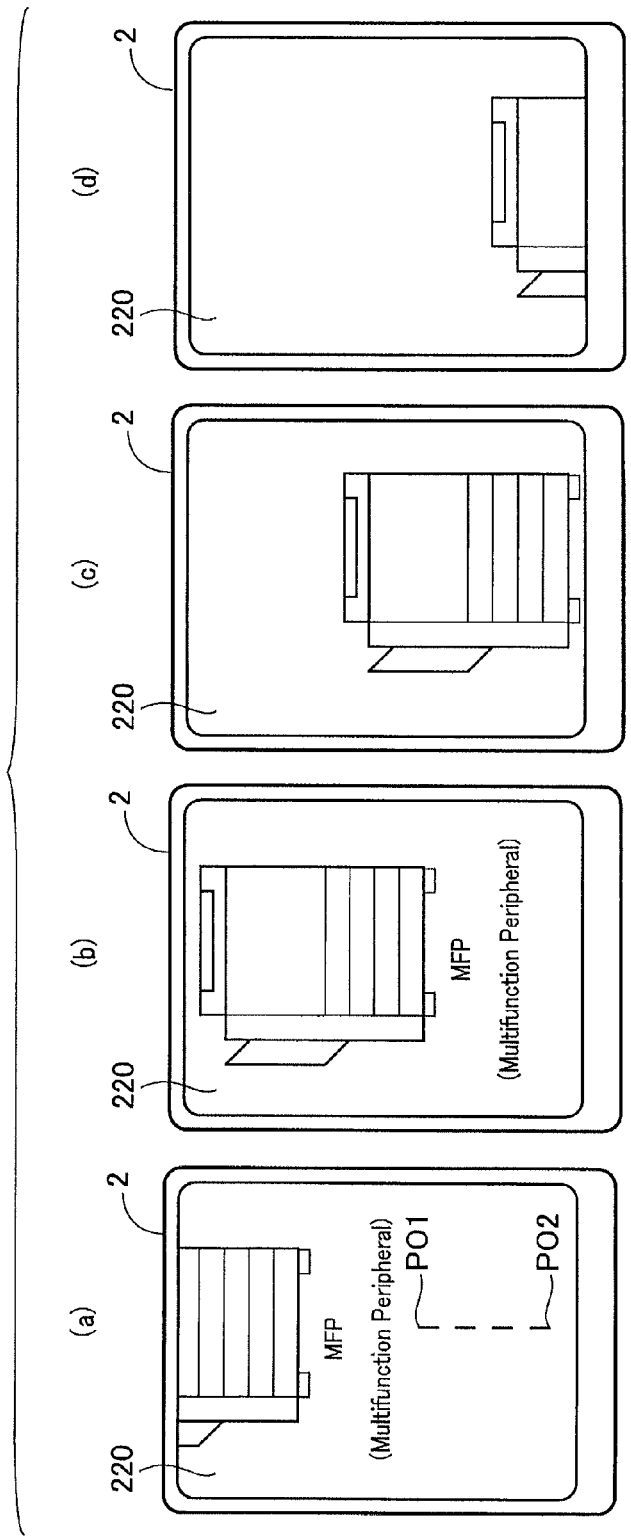
FIG. 4 is a diagram schematically showing a screen displayed by portable communication terminal 2 when portable communication terminal 2 accepts flick operation.

FIG. 4 is a diagram schematically showing a screen displayed by portable communication terminal 2 when portable communication terminal 2 accepts flick operation. In FIG. 4, (a) shows a screen displayed by portable communication terminal 2 when portable communication terminal 2 accepts flick operation (before the start of movement), (b) and (c) show screens displayed by portable communication terminal 2 from the start of moving the screen to before completion of moving (during movement), and (d) shows a screen displayed by portable communication terminal 2 when the movement of the screen is completed. The screens shown in (a) to (d) are still image screens.

Referring to FIG. 4(a), when the user using portable communication terminal 2 wishes to move the screen displayed by portable communication terminal 2 downward in (a), the user performs such flick operation as moving a manipulator (operating finger or operating tool) downward in (a) from a position PO1 to a position PO2 along a dotted line in (a) on touch panel 220. Upon accepting the flick operation, portable communication terminal 2 transmits flick information concerning the flick operation to image forming apparatus 1. Image forming apparatus 1 successively transmits screen data of screens (b), (c), and (d), which are the screens from the start of movement to completion of movement, to portable communication terminal 2, based on the received flick information. Portable communication terminal 2 successively displays the screens (b), (c), and (d), based on the screen data received from image forming apparatus 1 by portable communication terminal 2.

The flick information transmitted to image forming apparatus 1 by portable communication terminal 2 preferably includes a touch position of the manipulator on portable communication terminal 2 during flick operation, the moving direction of the manipulator on portable communication terminal 2 during flick operation, a position where the manipulator is released from portable communication terminal 2 during flick operation, and a touch time of the manipulator on portable communication terminal 2 during flick operation.

Figure 5:
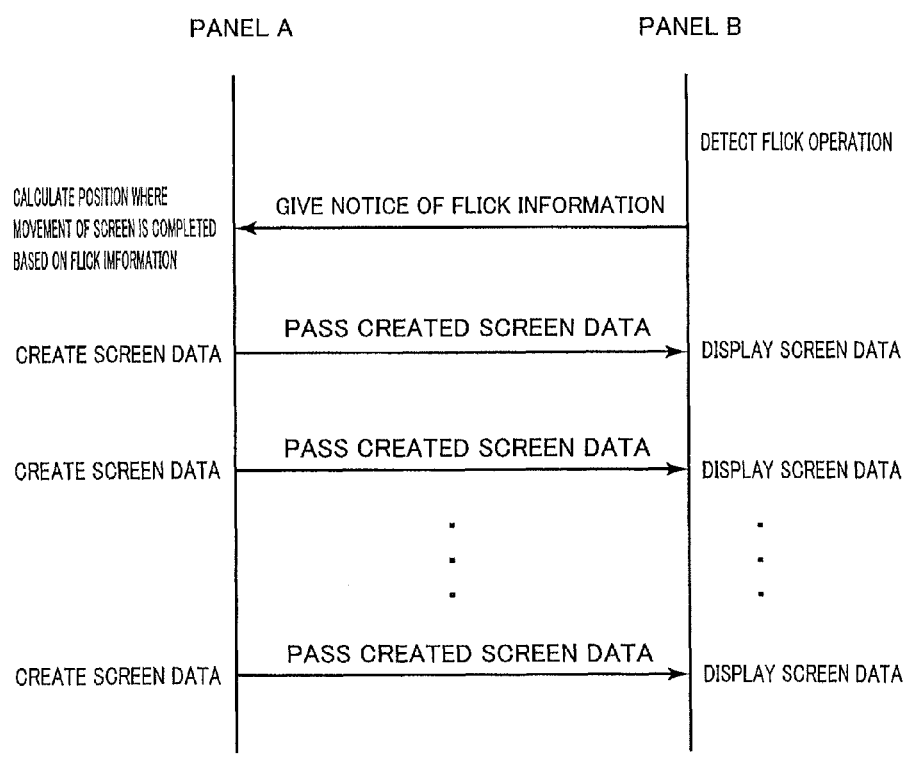
FIG. 5 is a sequence diagram showing an example of communication between a panel A and a panel B in the first embodiment of the present invention.

FIG. 5 is a sequence diagram showing an example of communication between a panel A and a panel B in the first embodiment of the present invention. It is noted that in the following description the first display device (image forming apparatus 1, a display device serving as a display source) may be called panel A, and the second display device (portable communication terminal 2, a display device serving as a display destination) may be called panel B.

Referring to FIG. 5, upon detection of flick operation on panel B, panel B gives a notice of flick information to panel A. Panel A calculates a position where movement of the screen is completed (the final position in screen movement) based on the received flick information. Then, panel A creates screen data of screens from the start of movement to completion of movement (screen data from the current display position to a state after the screen movement) one by one and successively passes the data to panel B. The screen data passed to panel B is screen data stored in fixed memory 110 in the present embodiment. Panel B displays screen data every time screen data of one screen is received.

Figure 6:
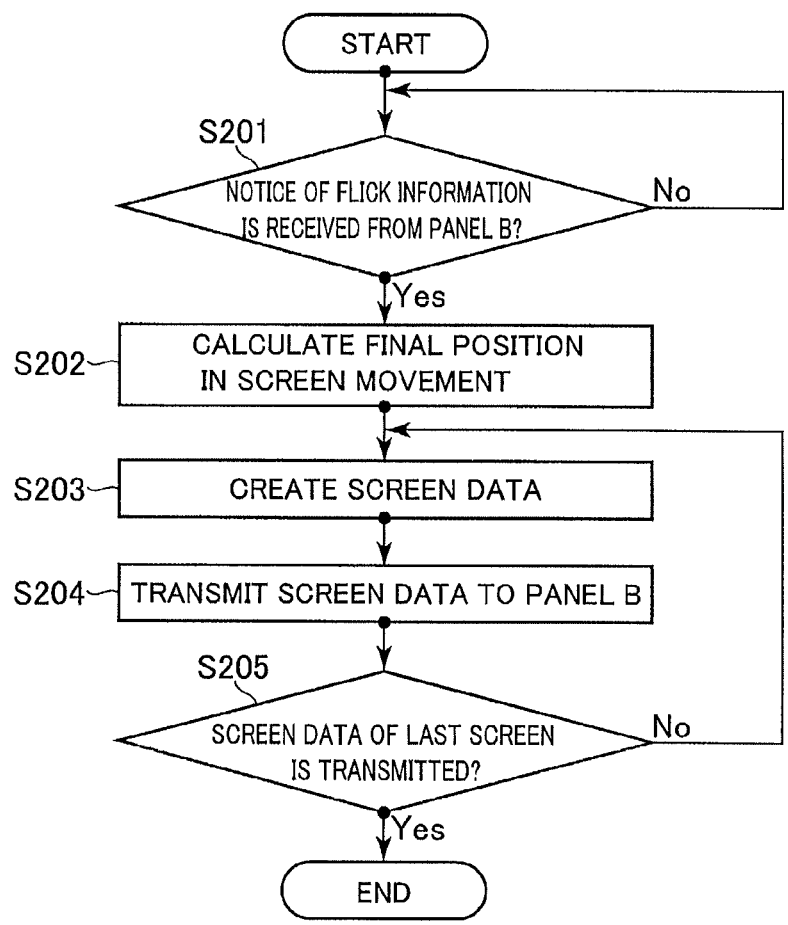
FIG. 6 is a flowchart illustrating operation of panel A in a case where flick operation is accepted on panel B in the first embodiment of the present invention.

FIG. 6 is a flowchart chart illustrating operation of panel A in a case where flick operation is accepted on panel B in the first embodiment of the present invention.

Referring to FIG. 6, CPU 101 of panel A determines whether a notice of flick information including an input position (a touch position of the manipulator) is received from panel B (S201). In step S201, if it is determined that a notice of flick information is received (YES in S201), CPU 101 calculates the final position in the screen movement through flick operation (S202) and proceeds to step S203. On the other hand, in step S201, if it is determined that no notice of flick information is received (NO in S201), CPU 101 executes the process in step S201 again (S201).

In step S203, CPU 101 creates screen data of screens from the start of movement to completion of movement (S203) and transmits the created screen data to panel B (S204). Next, CPU 101 determines whether the screen data of the last screen (the screen on completion of movement) is transmitted (S205).

In step S205, if it is determined that the screen data of the last screen is transmitted (YES in S205), CPU 101 terminates the process. On the other hand, in step S205, if it is determined that the screen data of the last screen is not transmitted (NO in S205), CPU 101 proceeds to the process in step S203 and creates screen data of the next screen (S203).

Figure 7:
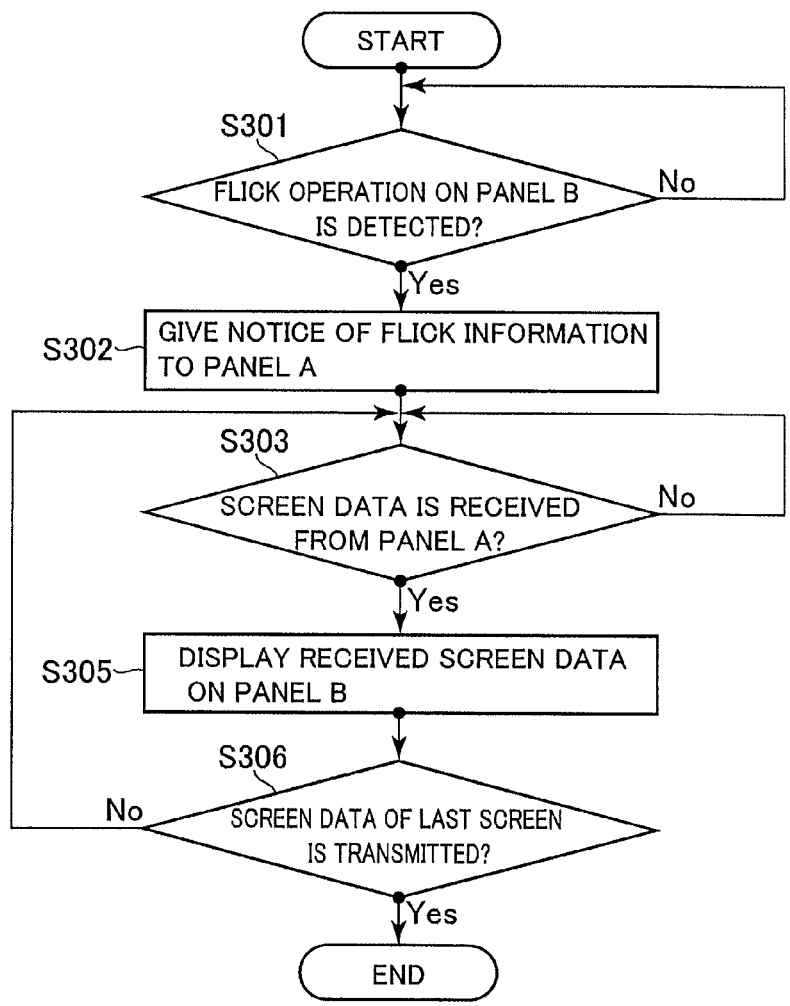
FIG. 7 is a flowchart illustrating operation of panel B in a case where flick operation is accepted on panel B in the first embodiment of the present invention.

FIG. 7 is a flowchart illustrating operation of panel B in a case where flick operation is accepted on panel B in the first embodiment of the present invention.

Referring to FIG. 7, CPU 201 of panel B determines whether flick operation on panel B is detected (S301). In step S301, if it is determined that flick operation is detected (YES in S301), CPU 201 gives a notice of flick information including an input position to panel A (S302) and proceeds to the process in step S303. On the other hand, in step S301, if it is determined that flick operation is not detected (NO in S301), CPU 201 executes the process in step S301 again (S301).

In step S303, CPU 201 determines whether screen data is received from panel A (S303). In step S303, if it is determined that screen data is received (YES in S303), CPU 201 displays the received screen data on panel B (S305) and proceeds to the process in step S306. On the other hand, in step S303, if it is determined that screen data is not received from panel A (NO in S303), CPU 201 executes the process in step S303 again (S303).

In step S306, CPU 201 determines whether the screen data of the last screen (the screen on completion of movement) is received (S306). In step S306, if it is determined that the screen data of the last screen is received (YES in S306), CPU 201 terminates the process. On the other hand, in step S306, if it is determined that the screen data of the last screen is not received (NO in S306), CPU 201 proceeds to step S303 and determines whether the screen data of the next screen is received from panel A (S303).

According to the present embodiment, when flick operation is performed on panel B, screen data is continuously sent from panel A to panel B so that the screens associated with the flick operation can be displayed on panel B. This allows the user to perform flick operation even in an environment such as a remote panel and provides comfortable (smooth, natural) screens in movement to be displayed on panel B with flick operation. As a result, the user's convenience is improved.

When panel A receives flick information, panel A may also display the screens of screen data from the start of movement to completion of movement that is stored in fixed memory 110, on panel A without changing the resolution.

Second Embodiment

In the present embodiment, panel A creates screen data having a resolution lower than the resolution of screen data stored by panel A, as screen data from the start of movement to before completion of movement, and transmits the created screen data to panel B.

Figure 8:
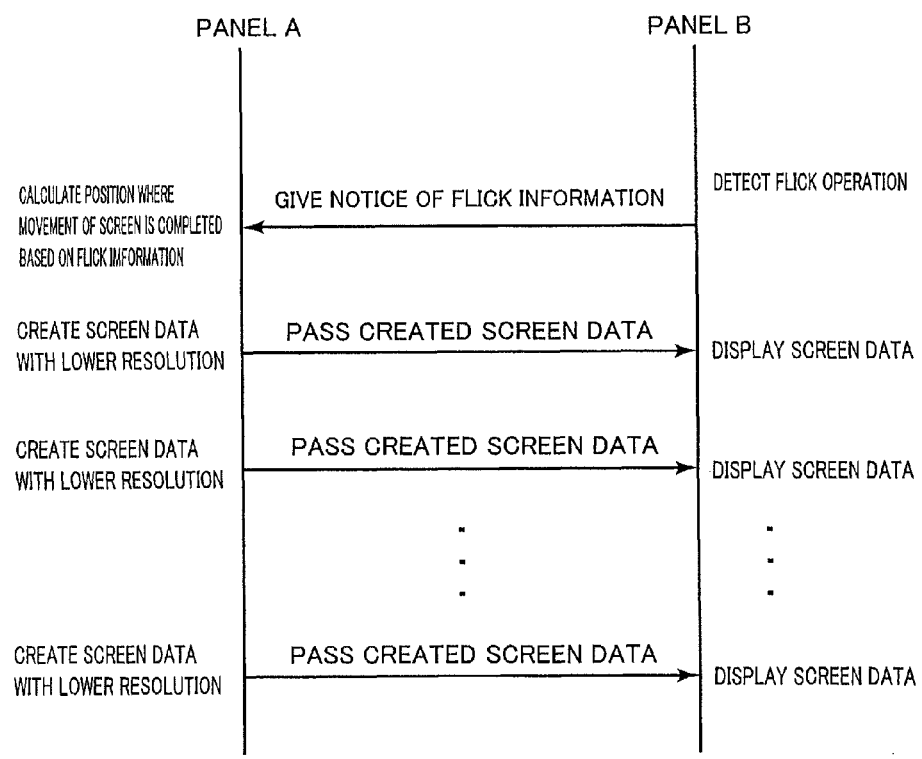
FIG. 8 is a sequence diagram showing an example of communication between panel A and panel B in a second embodiment of the present invention.

FIG. 8 is a sequence diagram showing an example of communication between panel A and panel B in a second embodiment of the present invention.

Referring to FIG. 8, upon detection of flick operation on panel B, panel. B gives a notice of flick information to panel B. Panel A calculates a position where movement of the screen is completed (the final position in screen movement) based on the received flick information. Next, panel A creates screen data of screens (the screen data with a reduced resolution) from the start of movement to completion of movement with a resolution lower than the resolution (the resolution of the screen data displayed on panel A) of the screen data stored in fixed memory 110 of panel A, one by one, and successively passes the created screen data to panel B. Panel B displays the screen data every time panel B receives the screen data of one screen.

Figure 9:
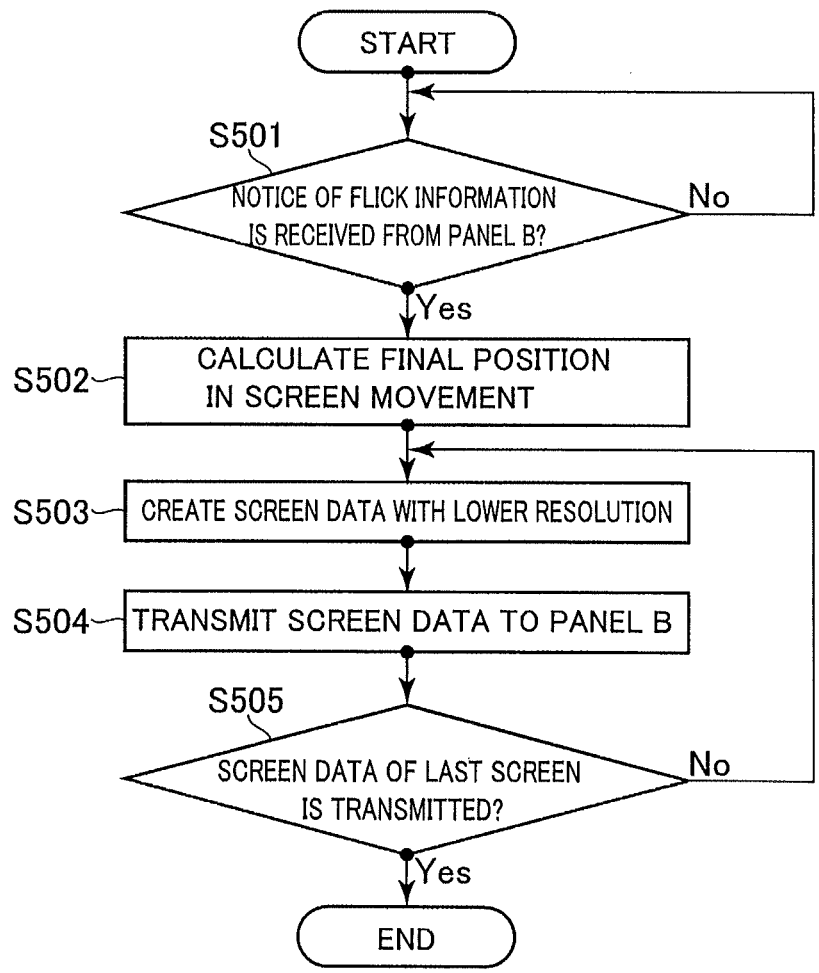
FIG. 9 is a flowchart illustrating operation of panel A in a case where flick operation is accepted on panel B in the second embodiment of the present invention.

FIG. 9 is a flowchart illustrating operation of panel A in a case where flick operation is accepted on panel B in the second embodiment of the present invention.

Referring to FIG. 9, in this flowchart, first, the processes in steps S501 and S502 that are similar to the processes in step S201 and S202 in the flowchart in the first embodiment shown in FIG. 6 are performed.

After the process in step S502, CPU 101 creates screen data of screens from the start of movement to completion of movement with a degraded (reduced) resolution, based on the screen data stored in fixed memory 110 (S503) and transmits the created screen data to panel B (S504). Next, CPU 101 determines whether the screen data of the last screen (the screen on completion of movement) is transmitted (S505).

In step S505, if it is determined that the screen data of the last screen is transmitted (YES in S505), CPU 101 terminates the process. On the other hand, in step S505, if it is determined that the screen data of the last screen is not transmitted (NO in S505), CPU 101 proceeds to the process in step S503 and creates screen data of the next screen with a reduced resolution (S503).

Figure 10:
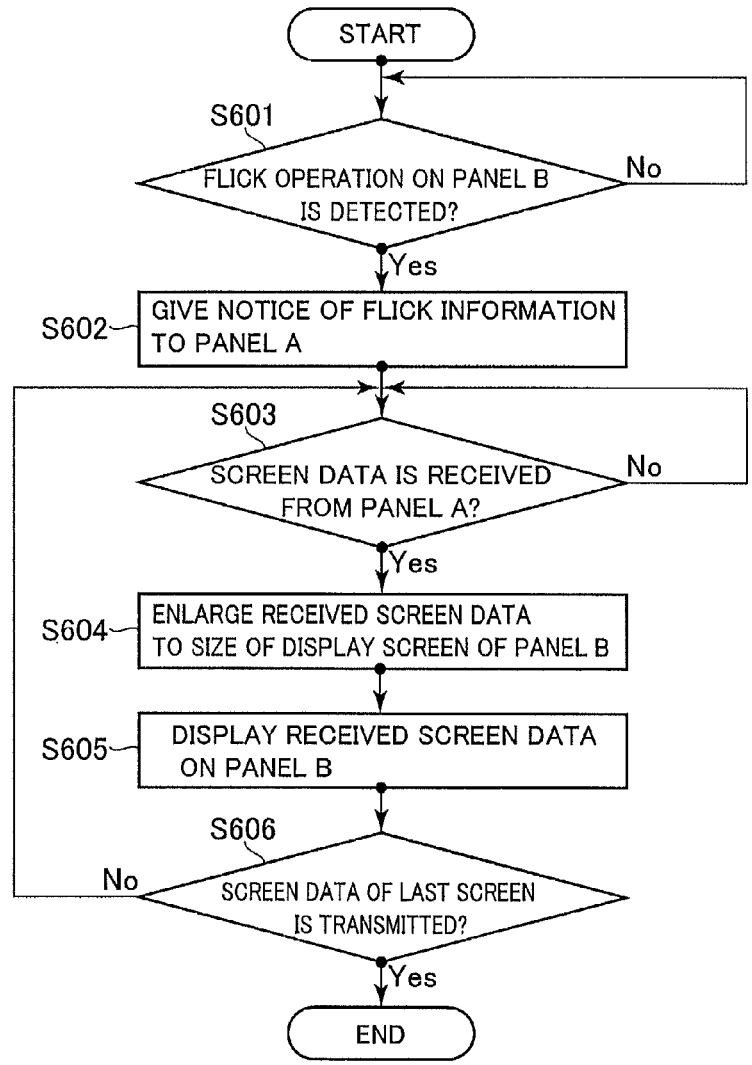
FIG. 10 is a flowchart illustrating operation of panel B in a case where flick operation is accepted on panel B in the second embodiment of the present invention.

FIG. 10 is a flowchart illustrating operation of panel B in a case where flick operation is accepted on panel B in the second embodiment of the present invention.

Referring to FIG. 10, in this flowchart, first, the processes in steps S601, S602, and S603 that are similar to the processes in steps S301, S302, and S303 in the flowchart in the first embodiment shown in FIG. 7 are performed.

After the process in step S603, CPU 201 enlarges the screen data received from panel A to the size of the display screen of panel B (S604). When the resolution of screen data is reduced, the size of the display region of the screen data after reduction of the resolution is smaller than the size of the display region of the screen data before reduction of the resolution. Therefore, CPU 201 performs the process in step S604 in order to display the screen based on the screen data with the reduced resolution appropriately in accordance with the size of the display screen of panel B. Thereafter, CPU 201 performs the processes in steps S605 and S606 that are similar to the processes in steps S305 and S306 in the flowchart in the first embodiment shown in FIG. 7, and terminates the process.

It is noted that the operation of panels A and B, the configuration of the display system, and the like except the foregoing description in the present embodiment are similar to those in the first embodiment, and a description thereof will not be repeated.

In the first embodiment, when flick operation on panel B is detected, panel A transmits screen data of a screen slightly moved from the currently displayed screen, and panel B receives and displays that screen data. This operation is repeated. Therefore, if the size of the transmitted screen data is large, the transmission speed of the screen data from panel A to panel B becomes slow. As a result, after flick operation, the screen slightly moves and stops, and then slightly moves and stops again. The resultant screen display may be rough or jaggy. Therefore, normal flick movement may not result, and user-friendly flick operation (such flick operation that matches with the user's sense) cannot be implemented.

The cause for this lies in that panel B implements screen display during movement associated with flick operation, by repeatedly acquiring screen data of screens changing little by little in the screen moving direction from panel A after detection of the flick operation. More specifically, panels A and B have to exchange screen data many times after a flick on the remote panel until the screen at the final position during movement by the flick is obtained. The traffic of this screen data is large, so that it takes time to complete transmission/reception of one screen.

According to the present embodiment, the resolution of the screen data is reduced when being transmitted from panel A to panel B, so that the traffic of the screen data can be reduced. As a result, the responsiveness of flick operation can be improved thereby implementing flick operation as desired by the user.

When a screen with a reduced resolution is displayed on panel B, panel A may display a screen without reducing a resolution (a screen of screen data stored in fixed memory 110) on panel A.

Third Embodiment

In the present embodiment, panel A transmits screen data having the same resolution as the resolution of screen data stored by panel A, to panel B, as screen data of the screen on completion of movement.

Figure 11:
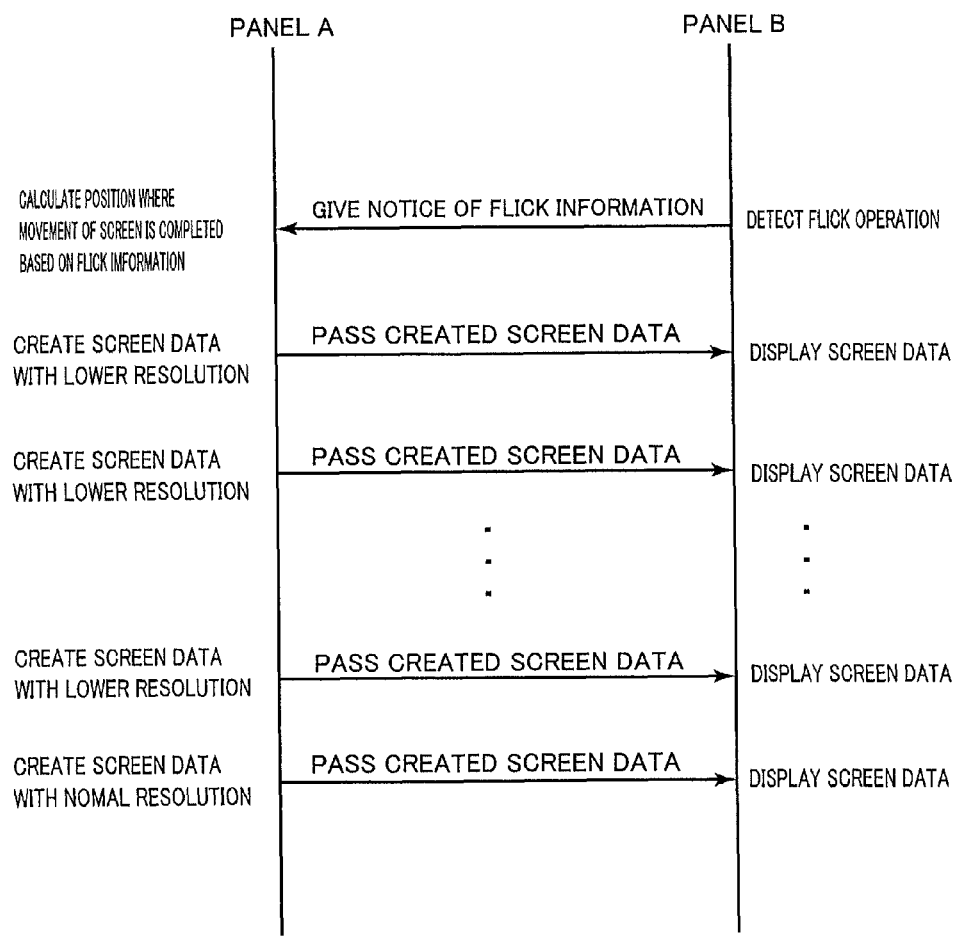
FIG. 11 is a sequence diagram showing an example of communication between panel A and panel B in a third embodiment of the present invention.

FIG. 11 is a sequence diagram showing an example of communication between panel A and panel B in a third embodiment of the present invention.

Referring to FIG. 11, panel A creates screen data having the same resolution (hereinafter this resolution may be referred to as a normal resolution) as the resolution of the screen data stored in fixed memory 110 of panel A (the resolution of the screen data displayed on panel A), as screen data of the last screen (screen data of the screen on completion of movement) and transmits the created screen data to panel B.

Figure 12:
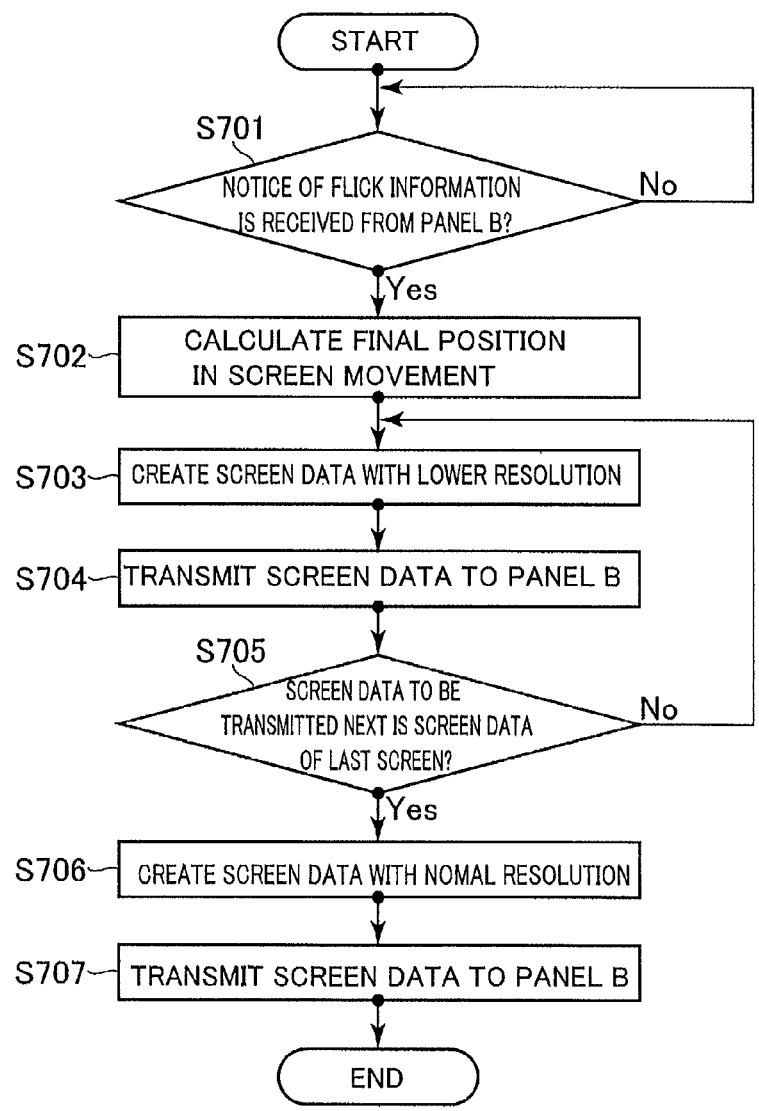
FIG. 12 is a flowchart illustrating operation of panel A in a case where flick operation is accepted on panel B in the third embodiment of the present invention.

FIG. 12 is a flowchart illustrating operation of panel A in a case where flick operation is accepted on panel B in the third embodiment of the present invention.

Referring to FIG. 12, in this flowchart, first, the processes in steps S701 and S702 that are similar to the processes in steps S201 and S202 in the flowchart in the first embodiment shown in FIG. 6 are performed.

After the process in step S702, CPU 101 creates screen data of a screen during movement with a degraded (reduced) resolution based on the screen data stored in fixed memory 110 (S703) and transmits the created screen data to panel B (S704). Next, CPU 101 determines whether the screen data to be transmitted (or created) next is the screen data of the last screen (screen data on completion of movement) (S705).

In step S705, if it is determined that it is the screen data of the last screen (YES in S705), CPU 101 creates screen data having the normal resolution as the screen data of the last screen (S706) and transmits the screen data to panel B (S707), and then terminates the process. On the other hand, in step S705, if it is determined that it is not the screen data of the last screen (NO in S705), CPU 101 proceeds to the process in step S703 and creates the screen data of the next screen with a reduced resolution, based on the screen data stored in fixed memory 110 (S703).

The operation of panel B in the case where flick operation is accepted on panel B is basically similar as in the second embodiment. However, in the process in step S604 shown in FIG. 10, if the screen data received from panel A is the screen data of the last screen, panel B displays the received screen data as it is without enlarging it. This is because the display region of the screen data of the last screen has the same size as the display region of panel B.

It is noted that the operation of panels A and B, the configuration of the display system, and the like except the foregoing description in the present embodiment are similar to those in the first or second embodiment, and therefore a description thereof will not be repeated.

According to the present embodiment, even when panel A transmits screen data with a degraded resolution as the screen data from the start of movement to completion of movement, panel A transmits screen data having the normal resolution as the screen data transmitted last (the screen data of the screen on completion of movement). Therefore, when the screen movement associated with flick operation is finished, the resolutions of the screens displayed on panel A and panel B are the same. As a result, reduction in resolution of the screen after completion of movement associated with flick operation can be prevented, and a screen visible to the user can be provided.

Fourth Embodiment

In the present embodiment, panel A measures a flick speed based on flick information and determines the resolution of the screen data created by panel A based on the measured flick speed (flick strength, flick speed information). The flick speed refers to a moving speed of the manipulator during flick operation and can be measured based on the touch position of the manipulator on panel B during flick operation, a position where the manipulator is released from panel B during flick operation, and a touch time of the manipulator on panel B during flick operation.

Figure 13:
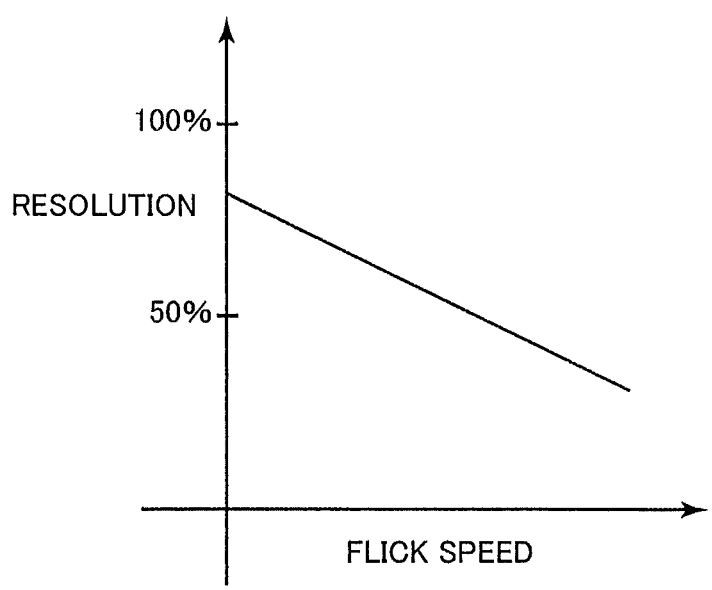
FIG. 13 is a graph showing the relation between flick speed and resolution in a fourth embodiment of the present invention.

FIG. 13 is a graph showing the relation between flick speed and resolution in a fourth embodiment of the present invention.

Referring to FIG. 13, in this graph, the resolution is reduced in proportion to the flick speed. Specifically, when the level of flick speed is 10 in ten levels, panel A determines the resolution of about 30% of the original resolution (the resolution of image data stored in fixed memory 110). When the level of flick speed is 5 in ten levels, panel A determines the resolution of about 50% of the original resolution. When the level of flick speed is 1 in ten levels, panel A determines the resolution of about 70% of the original resolution. Panel A creates screen data of screens from the start of movement to before completion of movement one by one with the determined resolution and successively passes the created screen data to panel B. Panel A creates screen data having the normal resolution as screen data of the last screen and transmits the created screen data to panel B. Panel B successively displays screens based on the received screen data.

The resolution is determined using the graph in FIG. 13, so that the traffic of screen data per screen can be reduced when the screen to be displayed by panel B should be moved quickly because of a quick flick. As a result, the responsiveness of flick operation can be improved thereby implementing flick operation as desired by the user.

Figure 14:
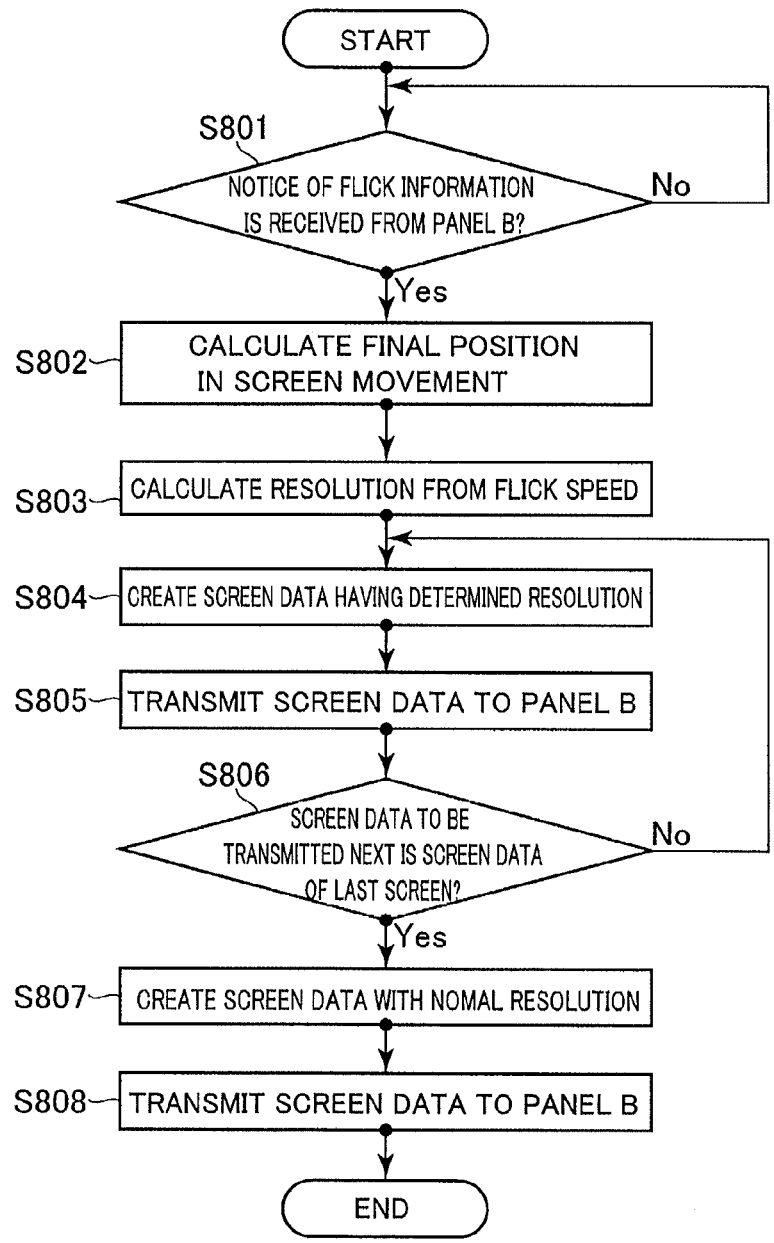
FIG. 14 is a flowchart illustrating operation of panel A in a case where flick operation is accepted on panel B in the fourth embodiment of the present invention.

FIG. 14 is a flowchart illustrating operation of panel A in a case where flick operation is accepted on panel B in the fourth embodiment of the present invention.

Referring to FIG. 14, in this flowchart, first, the processes in steps S801 and S802 that are similar to the processes in steps S201 and S202 in the flowchart in the first embodiment shown in FIG. 6 are performed.

After the process in step S802, CPU 101 measures the flick speed based on the flick information and determines (calculates) the resolution from the flick speed using the graph in FIG. 13 (S803). Then, CPU 101 creates screen data having the determined resolution as screen data of screens from the start of movement to before completion of movement (S804) and transmits the created screen data to panel B (S805). Next, CPU 101 determines whether the screen data to be transmitted next is the screen data of the last screen (S806).

In step S806, if it is determined that it is the screen data of the last screen (YES in S806), CPU 101 creates screen data having the normal resolution as the screen data of the last screen (S807) and transmits the screen data to panel B (S808), and then terminates the process. On the other hand, in step S806, if it is determined that it is not the screen data of the last screen (NO in S806), CPU 101 proceeds to the process in step S804 and creates screen data of the next screen with the determined resolution (S804).

It is noted that the operation of panels A and B, the configuration of the display system, and the like except the foregoing description in the present embodiment are similar to those in the first or second embodiment, and therefore a description thereof will not be repeated.

In the present embodiment, the resolution of screen data to be transmitted from panel A to panel B is changed depending on the flick speed (the strength of flick operation). In particular, when the flick speed is fast, the reduction ratio of resolution is increased, whereas when the flick speed is low, the reduction ratio of resolution is decreased. According to the present embodiment, when a strong flick operation is performed, the amount of moving the screen with the flick operation is large, and the traffic is thus large. However, increase in traffic can be prevented because the resolution of screen data is set lower. Thus, a quick screen movement can be achieved. On the other hand, when a weak flick operation is performed, the speed of moving the screen with the flick operation is slow, so that the screen is easy to see even during flick operation. However, degradation in visibility of the screen can be suppressed because the resolution of screen data is higher.

In the present embodiment, panel A measures the flick speed based on the flick information transmitted from panel B. However, panel B may measure the flick speed and transmit flick information including the flick speed to panel A.

Fifth Embodiment

In the present embodiment, panel A creates screen data in which the resolution of a screen gradually increases with screen movement.

Figure 15:
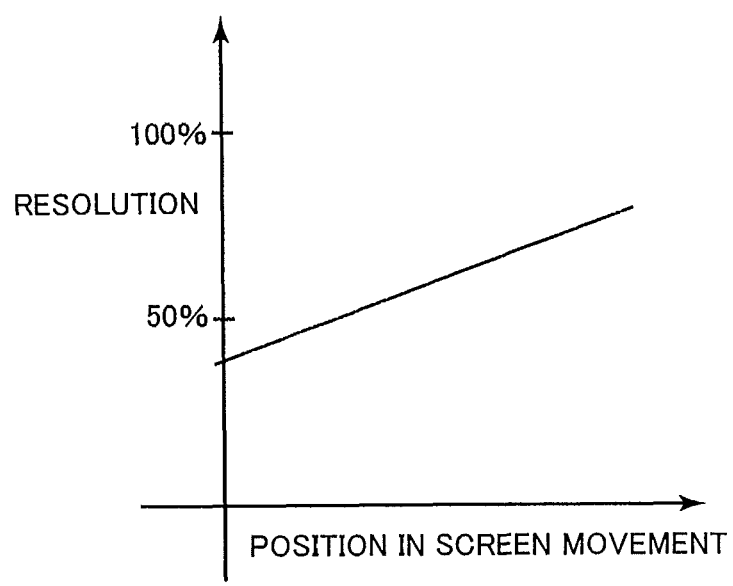
FIG. 15 is a graph showing the relation between position in screen movement and resolution in a fifth embodiment of the present invention.

FIG. 15 is a graph showing the relation between position in screen movement and resolution in a fifth embodiment of the present invention.

Referring to FIG. 15, in this graph, the resolution gradually increases as the position in screen movement progresses (the screen displayed by panel B approaches the screen on completion of movement). Specifically, the screen data immediately after the start of movement has a resolution of about 30% of the original resolution. Thereafter, the resolution of the screen data increases in proportion to the position in the screen movement. The screen data at an intermediate point of the screen movement has a resolution of about 50% of the original resolution. The screen data immediately before completion of the screen movement has a resolution of about 70% of the original resolution.

Panel A creates screen data of screens from the start of movement to before completion of movement one by one with the resolution determined based on the graph and successively passes the created screen data to panel B. Panel A creates screen data having the normal resolution as screen data of the last screen and transmits the created screen data to panel B. Panel B successively displays screens based on the received screen data.

Figure 16:
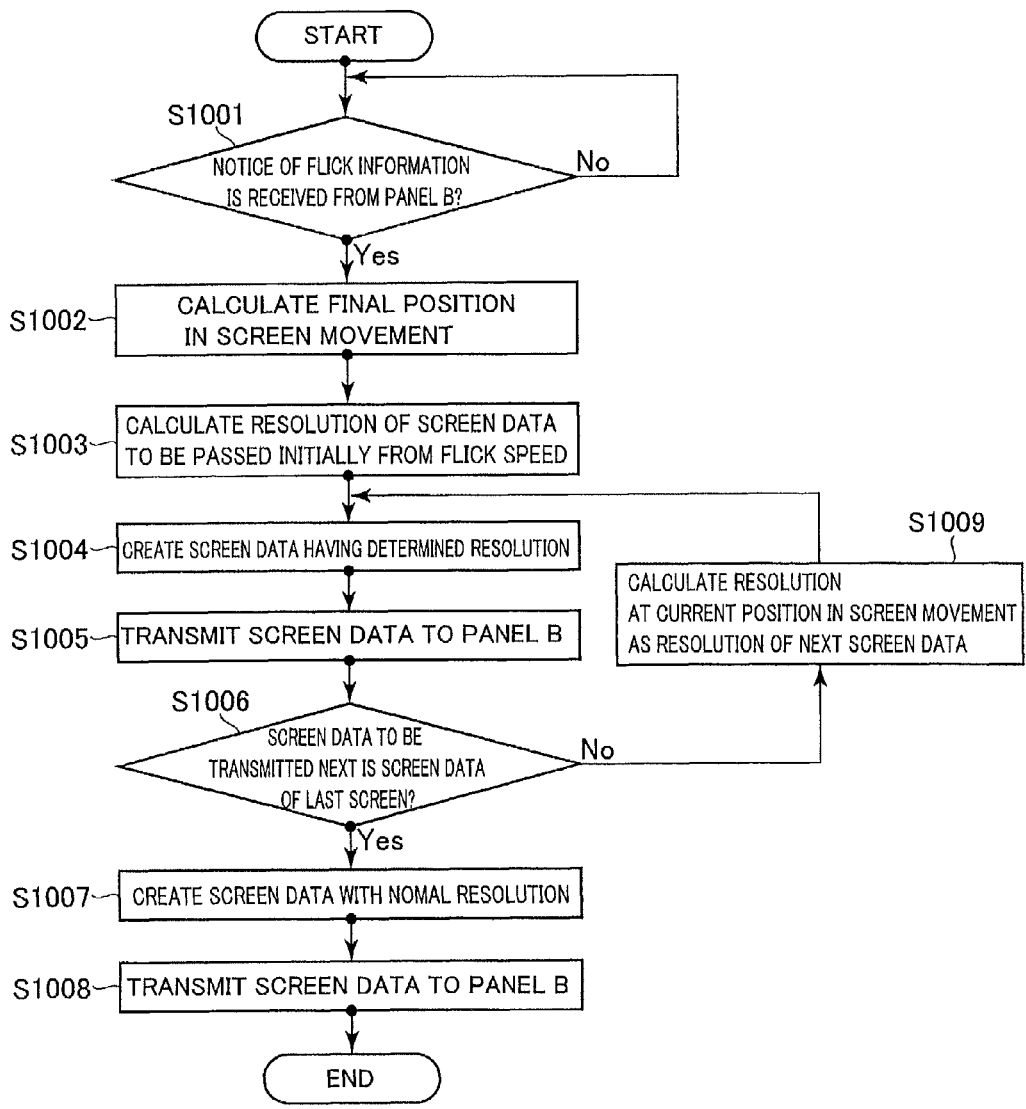
FIG. 16 is a flowchart illustrating operation of panel A in a case where flick operation is accepted on panel B in the fifth embodiment of the present invention.

FIG. 16 is a flowchart illustrating operation of panel A in a case where flick operation is accepted on panel B in the fifth embodiment of the present invention.

Referring to FIG. 16, in this flowchart, first, the processes in steps S1001 and S1002 that are similar to the processes in steps S201 and S202 in the flowchart in the first embodiment shown in FIG. 6 are performed.

After the process in step S1002, CPU 101 measures the flick speed (flick speed information) based on the flick information and calculates (determines) the resolution of the screen data to be passed initially (screen data of the screen immediately after the start of movement) from the flick speed based on the graph shown in FIG. 13 (S1003). Then, CPU 101 creates screen data with the determined resolution as the screen data of the screen immediately after the start of movement (S1004) and transmits the created screen data to panel B (S1005). Next, CPU 101 determines whether the screen data to be transmitted next is the screen data of the last screen (S1006).

In step S1006, if it is determined that it is the screen data of the last screen (YES in S1006), CPU 101 creates screen data having the normal resolution as the screen data of the last screen (S1007) and transmits the screen data to panel B (S1008), and then terminates the process. On the other hand, in step S1006, if it is determined that it is not the screen data of the last screen (NO in S1006), CPU 101 determines (calculates) the resolution at the current position in the screen movement as the resolution of the next screen data, based on the graph shown in FIG. 15 (S1009). Thereafter, CPU 101 proceeds to the process in step S1004 and creates the next screen data with the determined resolution (S1004).

It is noted that the operation of panels A and B, the configuration of the display system, and the like except the foregoing description in the present embodiment are similar to those in the first or second embodiment, and therefore a description thereof will not be repeated.

When the screen is moved through flick operation, the screen moving speed is usually the fastest at the start of moving the screen and is gradually slower as the completion of screen movement approaches. In the present embodiment, at the start of screen movement with flick operation, the resolution of the screen displayed by panel B is degraded, and as the completion of screen movement with flick operation approaches, the resolution of the screen displayed by panel B is gradually increased. When the screen moving speed is slow, the user can see the screen more finely. According to the present embodiment, as the screen moving speed is slower, the degree of reduction of the resolution is smaller, so that the user can easily recognize the screen during screen movement. As a result, the visibility is improved.

Sixth Embodiment

In the present embodiment, panel A creates screen data in which a screen having a relatively high resolution appears at regular intervals among screens having a relatively low resolution.

Figure 17:
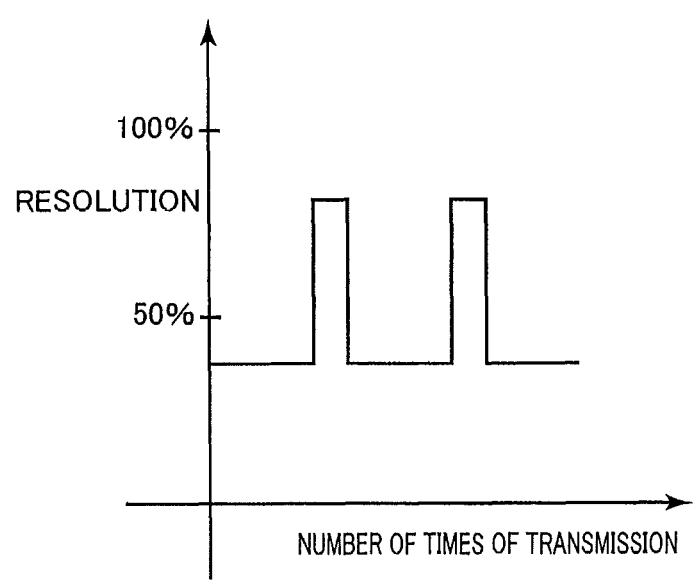
FIG. 17 is a graph showing the relation between the number of times panel A transmits screen data (the number of times of transmission) and resolution in a sixth embodiment of the present invention.

FIG. 17 is a graph showing the relation between the number of times panel A transmits screen data (the number of times of transmission) and resolution in a sixth embodiment of the present invention.

Referring to FIG. 17, in this graph, a higher resolution is interposed between relatively low resolutions. The resolution of the screen data in the case where the number of times of transmission is equal to an integral multiple of N (N is a natural number) is higher than other resolution. Specifically, when panel A transmits screen data eight times (in a case where N=8), one screen data has a relatively high resolution (for example, 70%) as compared with the resolution (for example, 30%) of other seven screen data.

Panel A creates screen data of screens from the start of movement to before completion of movement one by one with the resolution determined based on this graph and successively passes the created screen data to panel B. Panel A creates screen data having the normal resolution as the screen data of the last screen and transmits the created screen data to panel B. Panel B successively displays screens based on the received screen data.

Figure 18:
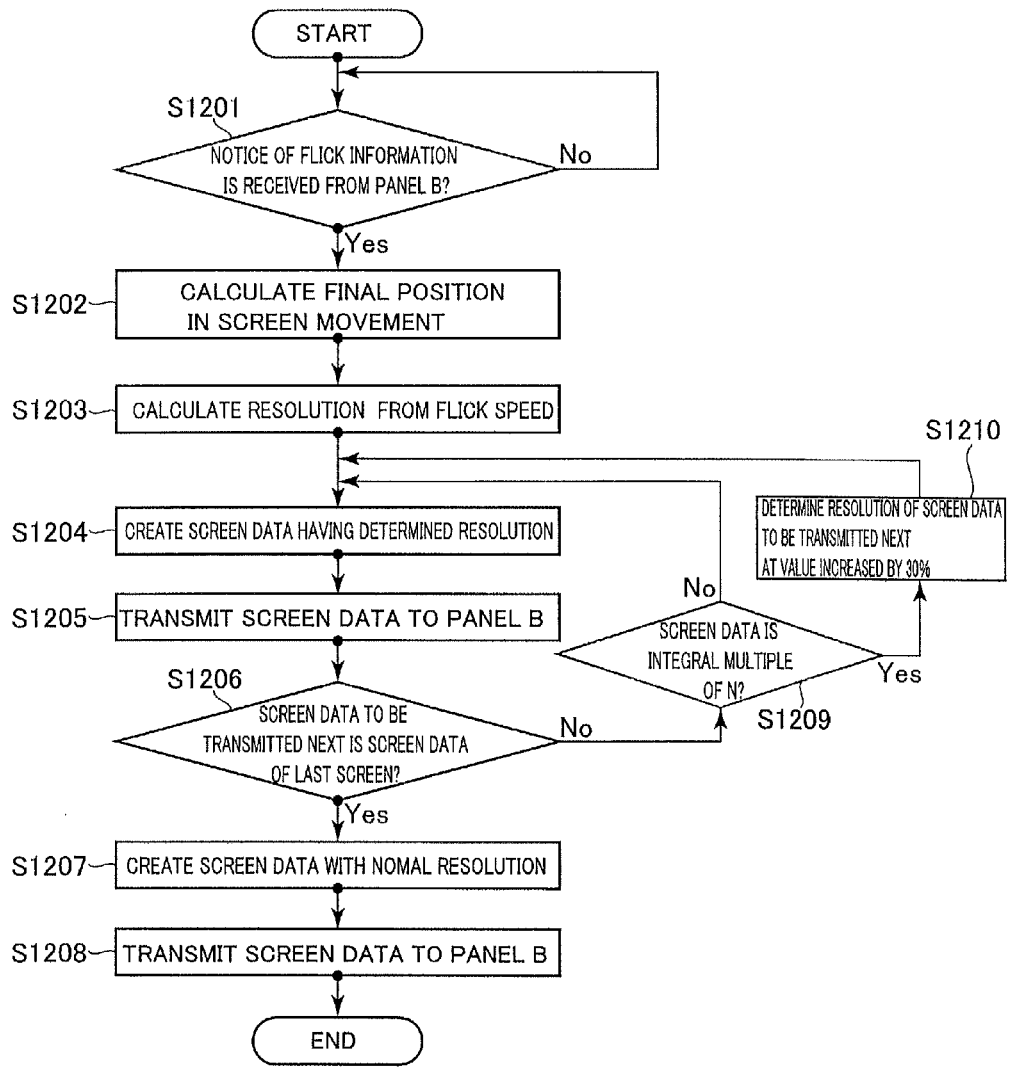
FIG. 18 is a flowchart illustrating operation of panel A in a case where flick operation is accepted on panel B in the sixth embodiment of the present invention.

FIG. 18 is a flowchart illustrating operation of panel A in a case where flick operation is accepted on panel B in the sixth embodiment of the present invention.

Referring to FIG. 18, in this flowchart, first, the processes in steps S1201 and S1202 that are similar to the processes in steps S201 and S202 in the flowchart in the first embodiment shown in FIG. 6 are performed.

After the process in step S1202, CPU 101 measures the flick speed based on the flick information and calculates (determines) the resolution of the screen data to be passed initially (the screen data of the screen at the start of movement) based on the flick speed using the graph shown in FIG. 13 (S1203). Then, CPU 101 creates screen data having the determined resolution as the screen data of the screen immediately after the start of movement (S1204) and transmits the created screen data to panel B (S1205). Next, CPU 101 determines whether the screen data to be transmitted next is the screen data of the last screen (S1206).

In step S1206, if it is determined that it is the screen data of the last screen (YES in S1206), CPU 101 creates screen data having the normal resolution as the screen data of the last screen (S1207) and transmits the screen data to panel B (S1208), and then terminates the process. On the other hand, in step S1206, if it is determined that it is not the screen data of the last screen (NO in S1206), CPU 101 determines whether the number of times of transmission of the screen data to be created next is an integral multiple of N (S1209).

In step S1209, if it is determined that it is an integral multiple of N (YES in S1209), CPU 101 determines the resolution of the screen data to be created next at a value increased by 30% from the resolution of the screen data in the case where the number of times of transmission is not an integral multiple of N (S1210), and proceeds to the process in step S1204. On the other hand, in step S1209, if it is determined that it is not an integral multiple of N (NO in S1209), CPU 101 proceeds to the process in step S1204 and creates screen data having the resolution initially determined (the resolution determined based on the flick speed) (S1204).

It is noted that the operation of panels A and B, the configuration of the display system, and the like except the foregoing description in the present embodiment are similar to those in the first or second embodiment, and therefore a description thereof will not be repeated.

If panel B continuously displays screens having a low resolution while the display screen on panel B is being moved, the user may find it difficult to grasp which position is currently displayed by panel B. According to the present embodiment, a screen having a relatively high resolution appears at regular intervals, so that the user can easily grasp which position is currently displayed by panel B.

Seventh Embodiment

In the present embodiment, panel A creates screen data in which the resolution of a screen varies in a sinusoidal wave (sine curve) with screen movement.

Figure 19:
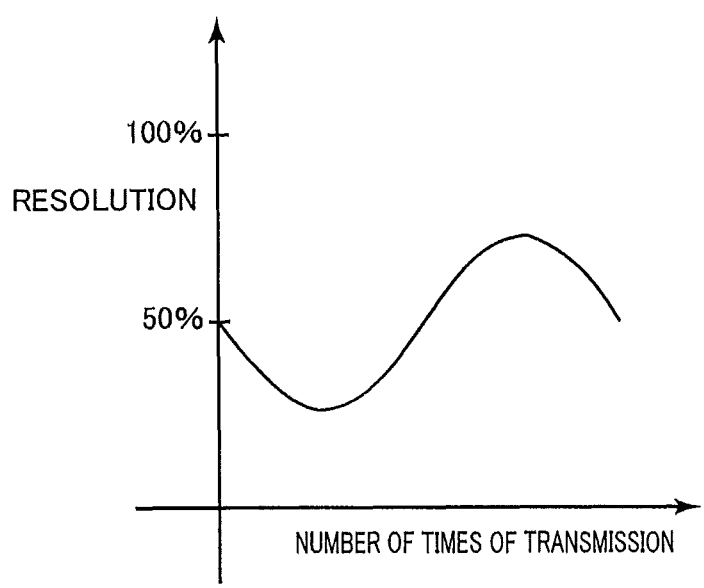
FIG. 19 is a graph showing the relation between the number of times panel A transmits screen data (the number of times of transmission) and resolution in a seventh embodiment of the present invention.

FIG. 19 is a graph showing the relation between the number of times panel A transmits screen data (the number of times of transmission) and resolution in a seventh embodiment of the present invention.

Referring to FIG. 19, in this graph, the resolution of screen data changes in the form of a sinusoidal wave, namely, 50%→40%→30%→20%→30%→40%→50%→60%→70%→80%→70%→60%→50% . . . as the number of times of transmission of screen data from panel A increases.

Panel A creates screen data of screens from the start of movement to before completion of movement one by one with the resolution determined based on this graph and successively passes the created screen data to panel B. Panel A creates screen data having the normal resolution as the screen data of the last screen and transmits the created screen data to panel B. Panel B successively displays screens based on the received screen data.

Figure 20:
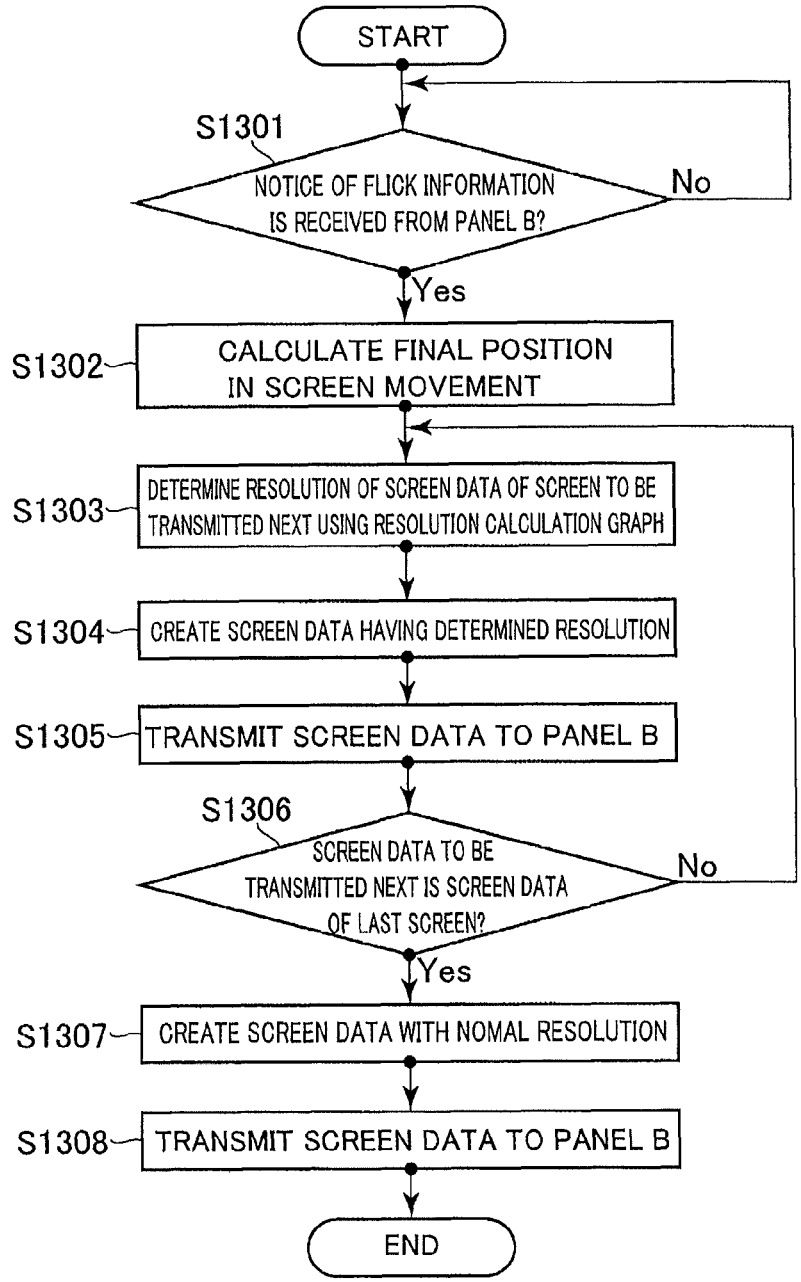
FIG. 20 is a flowchart illustrating operation of panel A in a case where flick operation is accepted on panel B in the seventh embodiment of the present invention.

FIG. 20 is a flowchart illustrating operation of panel A in a case where flick operation is accepted on panel B in the seventh embodiment of the present invention.

Referring to FIG. 20, in this flowchart, first, the processes in steps S1301 and S1302 that are similar to the processes in step S201 and S202 in the flowchart in the first embodiment shown in FIG. 6 are performed.

After the process in step S1302, CPU 101 determines the resolution of screen data of the screen to be transmitted next, based on the number of times of transmission of screen data, using the graph shown in FIG. 19 (resolution calculation graph) (S1303). Then, CPU 101 creates screen data having the determined resolution (S1304) and transmits the created screen data to panel B (S1305). Next, CPU 101 determines whether the screen data to be transmitted next is the screen data of the last screen (S1306).

In step S1306, if it is determined that it is the screen data of the last screen (YES in S1306), CPU 101 creates screen data having the normal resolution as the screen data of the last screen (S1307) and transmits the screen data to panel B (S1308), and then terminates the process. On the other hand, in step S1306, if it is determined that it is not the screen data of the last screen (NO in S1306), CPU 101 proceeds to the process in step S1303 and determines the resolution of the screen data to be transmitted next (S1303).

It is noted that the operation of panels A and B, the configuration of the display system, and the like except the foregoing description in the present embodiment are similar to those in the first or second embodiment, and therefore a description thereof will not be repeated.

According to the present embodiment, a screen having a high resolution periodically appears, so that the user can easily grasp which position is currently displayed by panel B, in a similar manner as in the sixth embodiment.

Eighth Embodiment

In the present embodiment, panel A creates screen data in which the resolution of the touch position on panel B in flick operation is higher than the resolution around the periphery of the touch position on panel B in the flick operation.

Figure 21:
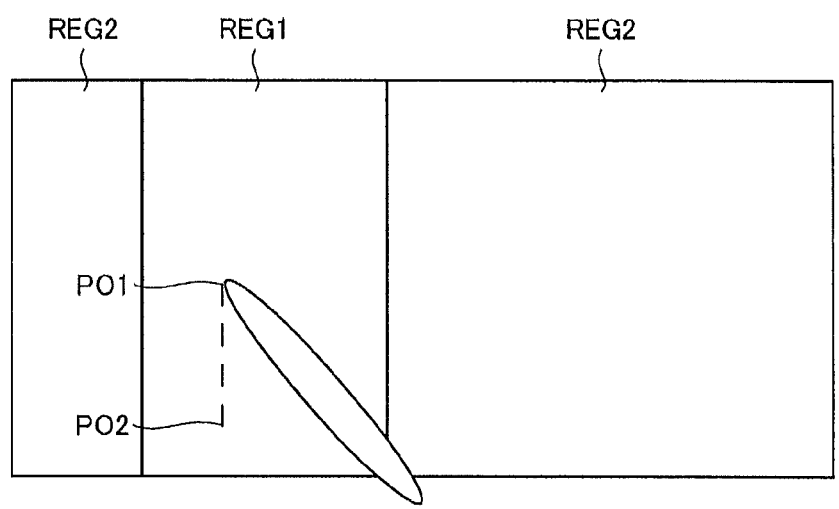
FIG. 21 is a diagram illustrating a method of determining an area where resolution is increased in an eighth embodiment of the present invention.

FIG. 21 is a diagram illustrating a method of determining an area where resolution is increased in an eighth embodiment of the present invention.

Referring to FIG. 21, it is assumed that the user performs flick operation on panel B so as to move the manipulator downward in FIG. 21 from a position PO1 to a position PO2 along a dotted line in FIG. 21. When panel A receives flick information concerning this flick operation, panel A creates screen data with a reduced resolution, as screen data from the start of movement to before completion of movement. In this case, panel A creates screen data such that the degree of reduction in resolution in a region REG1 that includes the position PO1 which is the touch position on panel B in the flick operation (the region around the periphery of the coordinate position on the input screen) is smaller than that of the resolution in a region REG2 that is the entire region excluding the region REG1. Specifically, the region REG2 has a resolution of about 30% of the original resolution, whereas the region REG1 has a resolution of about 50% of the original resolution. It is preset, for example, in ROM 102 that the region REG1 in FIG. 21 is an area within two centimeters to the left and right in FIG. 21 from the center line extending in the vertical direction in FIG. 21 from the touch position of the manipulator.

Panel A creates screen data of screens from the start of movement to before completion of movement one by one with the resolution determined by the method described above and successively passes the created screen data to panel B. Panel A creates screen data having the normal resolution as the screen data of the last screen and transmits the created screen data to panel B. Panel B successively displays screens based on the received screen data.

Figure 22:
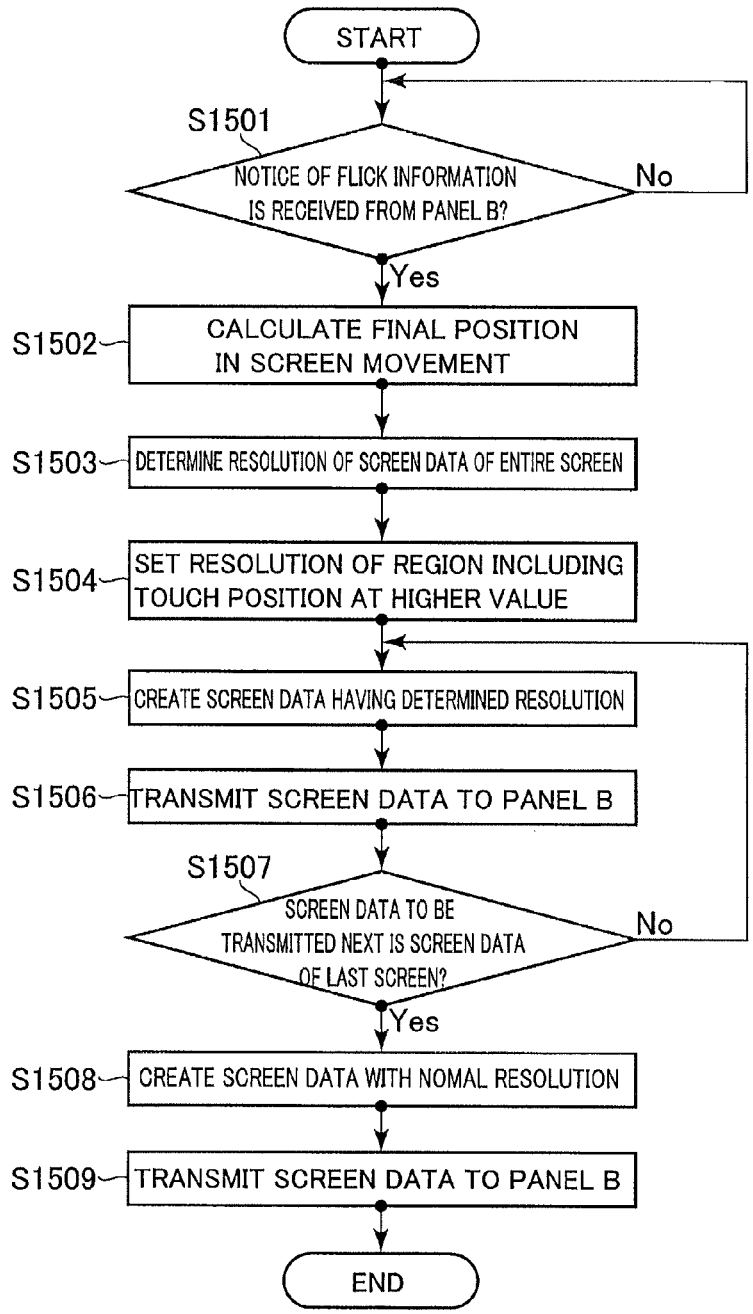
FIG. 22 is a flowchart illustrating operation of panel A in a case where flick operation is accepted on panel B in the eighth embodiment of the present invention.

FIG. 22 is a flowchart illustrating operation of panel A in a case where flick operation is accepted on panel B in the eighth embodiment of the present invention.

Referring to FIG. 22, in this flowchart, first, the processes in steps S1501 and S1502 that are similar to the processes in steps S201 and S202 in the flowchart in the first embodiment shown in FIG. 6 are performed.

After the process in step S1502, CPU 101 determines the resolution of the region REG2 (the resolution of the entire screen) in each of screens from the start of movement to before completion of movement, for example, based on the flick speed (S1503). Then, CPU 101 determines (sets) the resolution of the region REG1 at a value partially higher than the resolution of the region REG1 in each of the screens from the start of movement to before completion of movement, based on the touch position of the manipulator in the flick operation (S1504). Next, CPU 101 creates screen data having the resolutions determined in steps S1503 and S1504 (S1505) and transmits the created screen data to panel B (S1506). Next, CPU 101 determines whether the screen data to be transmitted next is the screen data of the last screen (S1507).

In step S1507, if it is determined that it is the screen data of the last screen (YES in S1507), CPU 101 creates screen data having the normal resolution as the screen data of the last screen (S1508) and transmits the screen data to panel B (S1509), and then terminates the process. On the other hand, in step S1507, if it is determined that it is not the screen data of the last screen (NO in S1507), CPU 101 proceeds to the process in step S1505 and creates the screen data to be passed next (S1505)

It is noted that the operation of panels A and B, the configuration of the display system, and the like except the foregoing description in the present embodiment are similar to those in the first or second embodiment, and therefore a description thereof will not be repeated.

It is likely that the touch position on panel B in flick operation is an area (line) that the user wants to see most. According to the present embodiment, the resolution of the region REG1 is set higher than the resolution of the other region, so that the user can easily recognize the screen in the area the user wants to see, thereby preventing the user from missing the screen.

It is noted that the shape or area of the region REG1 can be set arbitrarily as long as the region REG1 includes the touch position on panel B in flick operation.

Ninth Embodiment

In the present embodiment, panel A creates screen data in which the resolution at an end portion of a screen is lower than the resolution in a central position of the screen.

Figure 23:
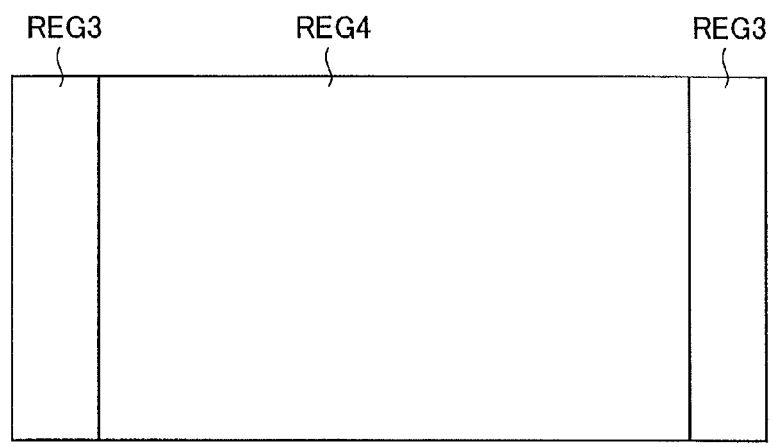
FIG. 23 is a diagram illustrating a method of determining an area where resolution is reduced in a ninth embodiment of the present invention.

FIG. 23 is a diagram illustrating a method of determining an area where resolution is reduced in a ninth embodiment of the present invention.

Referring to FIG. 23, panel A creates screen data having a reduced resolution as screen data from the start of movement to before completion of movement. In this case, panel A creates screen data such that the resolution of a region REG3 in the vicinity of end portions (left and right in FIG. 23) with respect to the screen moving direction on panel A is lower than the resolution of a region REG4 in the vicinity of a central portion of the screen. Specifically, the region REG4 has a resolution of about 40% of the original resolution, whereas the region REG3 has a resolution of about 10 to 20% of the original resolution. The region REG3 is preset, for example, in ROM 102.

Panel A creates screen data of screens from the start of movement to before completion of movement one by one with the resolution determined by the method described above and successively passes the created screen data to panel B. Panel A creates screen data having the normal resolution as the screen data of the last screen and transmits the created screen data to panel B. Panel B successively displays screens based on the received screen data.

Figure 24:
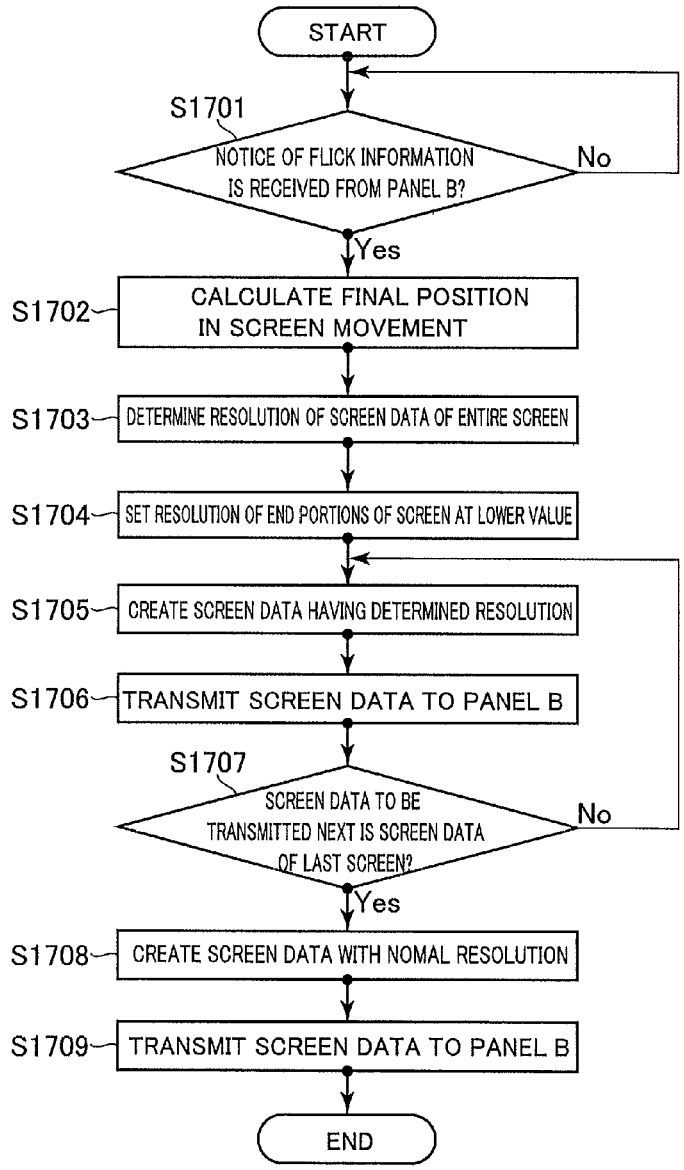
FIG. 24 is a flowchart illustrating operation of panel A in a case where flick operation is accepted on panel B in the ninth embodiment of the present invention.

FIG. 24 is a flowchart illustrating operation of panel A in a case where flick operation is accepted on panel B in the ninth embodiment of the present invention.

Referring to FIG. 24, in this flowchart, first, the processes in steps S1701 and S1702 that are similar to the processes in steps S201 and S202 in the flowchart in the first embodiment shown in FIG. 6 are performed.

After the process in step S1702, CPU 101 determines the resolution of the region REG4 (the resolution of the entire screen) in each of the screens from the start of movement to before completion of movement, for example, based on the flick speed (S1703). Then, CPU 101 determines (sets) the resolution of the region REG3 at a value partially lower than the resolution of REG4 in each of the screens from the start of movement to before completion of movement (S1704). Next, CPU 101 creates screen data having the resolutions determined in steps S1703 and S1704 (S1705) and transmits the created screen data to panel B (S1706). Next, CPU 101 determines whether the screen data to be transmitted next is the screen data of the last screen (S1707).

In step S1707, if it is determined that it is the screen data of the last screen (YES in S1707), CPU 101 creates screen data having the normal resolution as the screen data of the last screen (S1708) and transmits the screen data to panel B (S1709), and then terminates the process. On the other hand, in step S1707, if it is determined that it is not the screen data of the last screen (NO in S1707), CPU 101 proceeds to the process in step S1705 and creates the screen data to be passed next (S1705).

It is noted that the operation of panels A and B, the configuration of the display system, and the like except the foregoing description in the present embodiment are similar to those in the first or second embodiment, and therefore a description thereof will not be repeated.

For example, in the foregoing eighth embodiment, when the resolution of the region REG1 is partially increased, the size of the screen data transmitted by panel A (the traffic between panel A and panel B) is increased accordingly. According to the present embodiment, the resolution of the screen data in the region REG3 in the vicinity of the end portions of the screen on panel B is partially degraded, thereby preventing slow communication between panel A and panel B. As a result, the responsiveness of flick operation can be improved, and the convenience and operability can be enhanced.

It is noted that the shape and area of region REG3 can be set arbitrarily as long as the region REG3 is the end portion of the screen on panel B.

Tenth Embodiment

In the present embodiment, when the screens from the start of movement to before completion of movement on panel B include an image, panel A creates screen data in which the image is grayed out.

Figure 25:
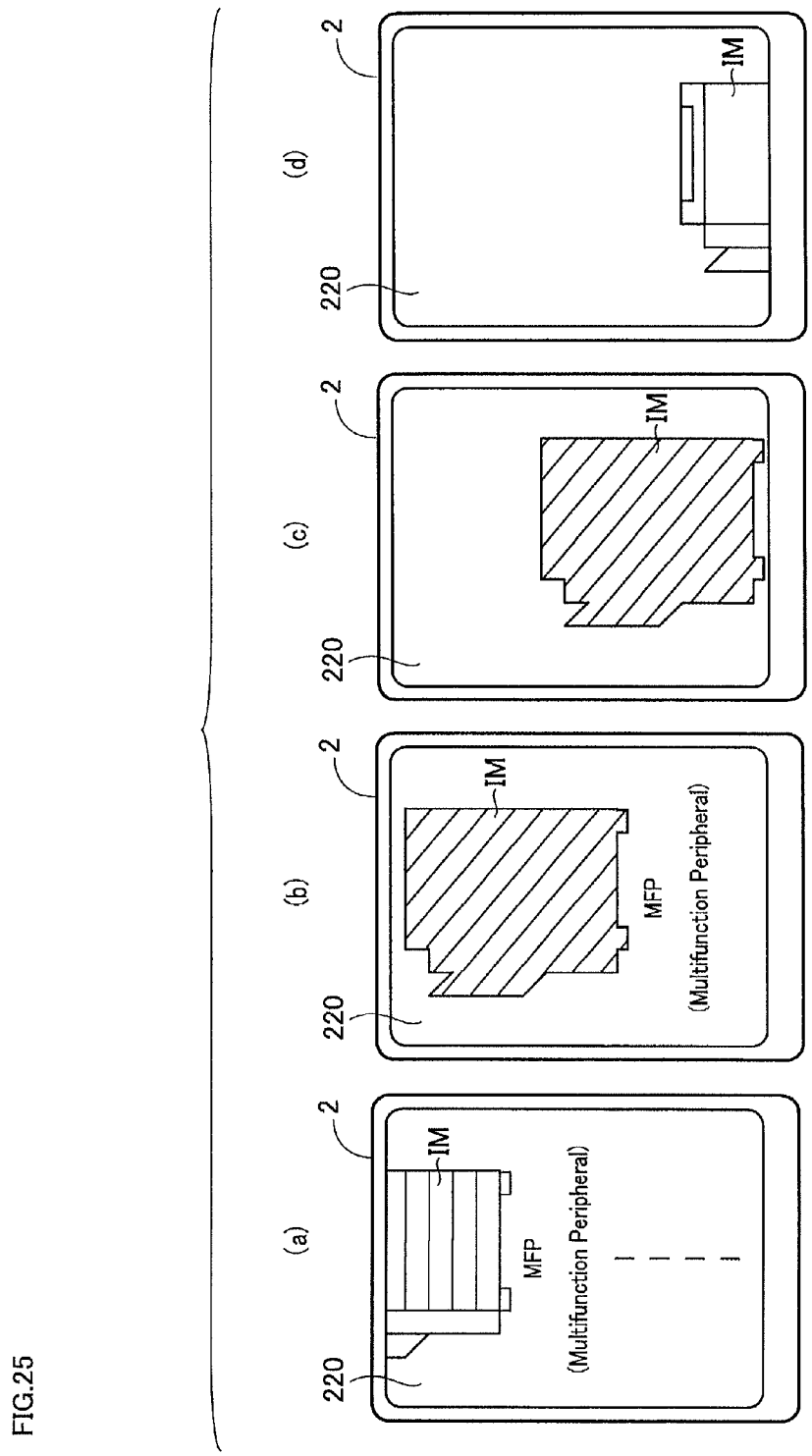
FIG. 25 is a diagram schematically showing a screen including an image that is displayed by portable communication terminal 2 when portable communication terminal 2 accepts flick operation.

FIG. 25 is a diagram schematically showing a screen including an image that is displayed by portable communication terminal 2 when portable communication terminal 2 accepts flick operation. In FIG. 25, (a) shows a screen displayed by portable communication terminal 2 when portable communication terminal 2 accepts flick operation (before the start of movement), (b) and (c) show screens displayed by portable information terminal 2 from the start of moving the screen before completion of moving (during movement), and (d) shows a screen displayed by portable communication terminal 2 when the movement of the screen is completed. The screens shown in (a) to (d) are all still image screens.

Referring to FIG. 25, when flick information is accepted from panel B, panel A determines whether the screen data from the start of movement to before completion of movement includes image information. In FIG. 25, an image IM is included in (b) and (c) which are screens from the start of movement to before completion of movement. When image information is included in screen data from the start of movement to before completion of movement, panel A creates screen data in which the area of the image information from the start of movement to before completion of movement is grayed out. In FIG. 25, the image IM grayed out is hatched.

Panel A creates screen data of screens from the start of movement to before completion of movement one by one, in which the image is grayed out by the method described above, and successively passes the created screen data to panel B. Panel A creates screen data having the normal resolution as the screen data of the last screen and transmits the created screen data to panel B. Panel B successively displays screens based on the received screen data.

Figure 26:
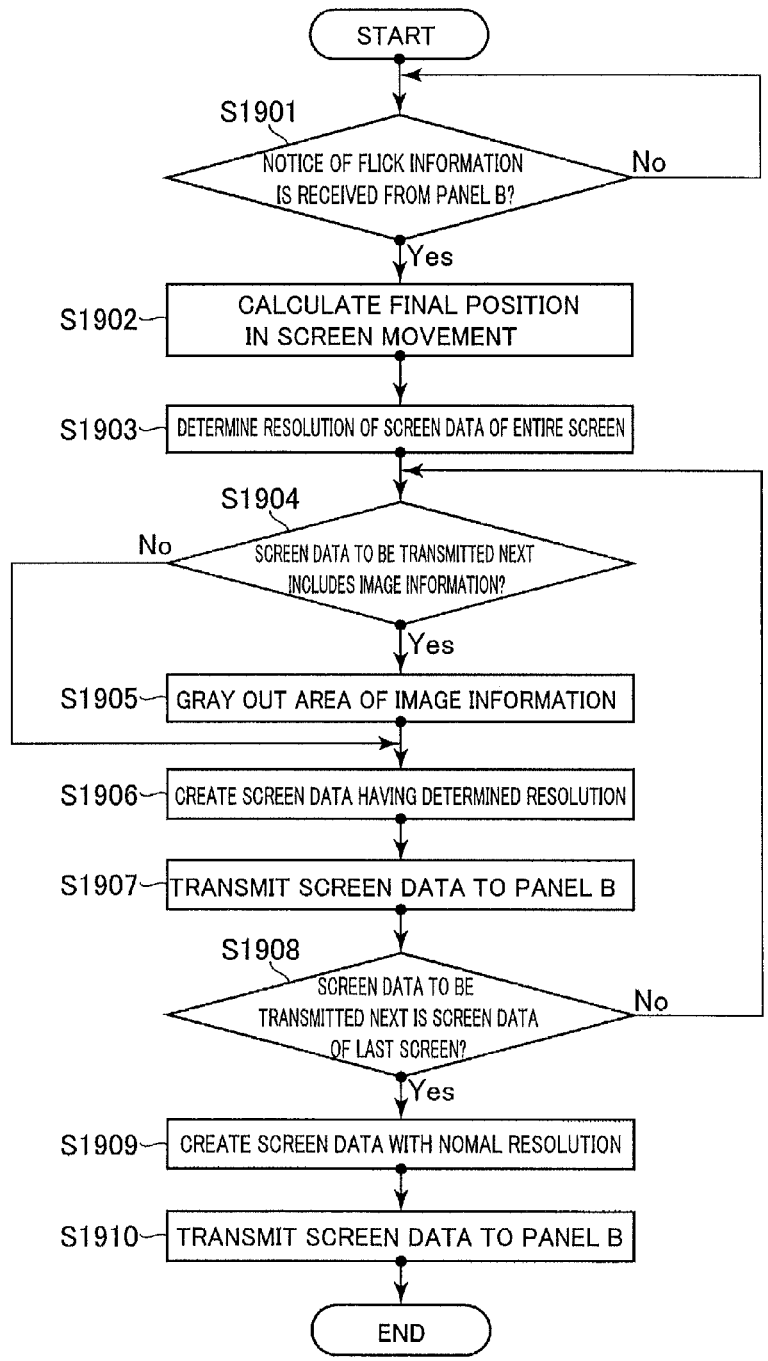
FIG. 26 is a flowchart illustrating operation of panel A in a case where flick operation is accepted on panel B in a tenth embodiment of the present invention.

FIG. 26 is a flowchart illustrating operation of panel A in a case where flick operation is accepted on panel B in a tenth embodiment of the present invention.

Referring to FIG. 26, in this flowchart, first, the processes in steps S1901 and S1902 that are similar to the processes in steps S201 and S202 in the flowchart in the first embodiment shown in FIG. 6 are performed.

After the process in step S1902, CPU 101 determines the resolution of screen data from the start of movement to before completion of movement, for example, based on the flick speed (S1903). Next, CPU 101 determines whether the screen data to be transmitted next from panel A to panel B includes image information (S1904).

In step S1904, if it is determined that image information is included (YES in S1904), CPU 101 grays out the area of the image information (S1905) and creates screen data having the resolution determined in the process in step S1903 (S1906). On the other hand, in step S1904, if it is determined that image information is not included (NO in S1904), CPU 101 proceeds to the process in step S1906 without graying out.

After the process in step S1906, CPU 101 transmits the created screen data to panel B (S1907). Next, CPU 101 determines whether the screen data to be transmitted next is the screen data of the last screen (S1908).

In step S1908, if it is determined that it is the screen data of the last screen (YES in S1908), CPU 101 creates screen data having the normal resolution as the screen data of the last screen (S1909) and transmits the screen data to panel B (S1910), and then terminates the process. On the other hand, in step S1908, if it is determined that it is not the screen data of the last screen (NO in S1908), CPU 101 proceeds to the process in step S1904 and determines whether the screen data of the screen to be transmitted next from panel A to panel B includes image information (S1904).

It is noted that the operation of panels A and B, the configuration of the display system, and the like except the foregoing description in the present embodiment are similar to those in the first or second embodiment, and therefore a description thereof will not be repeated.

When screen data includes image information, the size of the screen data transmitted by panel A (traffic between panel A and panel B) is increased accordingly. As a result, the screen movement by flick operation may not be smooth. In the present embodiment, when screen data includes image information, the screen data can be reduced by graying out the area of the image information. As a result, the responsiveness of flick operation can be improved, and the convenience and operability can be enhanced.

Eleventh Embodiment

In the present embodiment, when the screens from the start of movement to before completion of movement on panel B include an image, panel A creates screen data in which the resolution of the image IM is lower than the resolution of the region other than the image.

Referring to FIG. 25, when flick information is accepted from panel B, panel A determines whether image information is included in screen data from the start of movement to before completion of movement. In FIG. 25, the screens (b) and (c), which are screens from the start of movement to before completion of movement, include the image IM. When image information is included in screen data from the start of movement to before completion of movement in this manner, panel A creates screen data in which the resolution of the area of the image information from the start of movement to before completion of movement is set lower than the resolution of the other area. In FIG. 25, the image IM having a reduced resolution is hatched. Specifically, the area of the image information has a resolution of about 10% of the original resolution, whereas the area excluding the image information has a resolution of about 40% of the original resolution.

Figure 27:
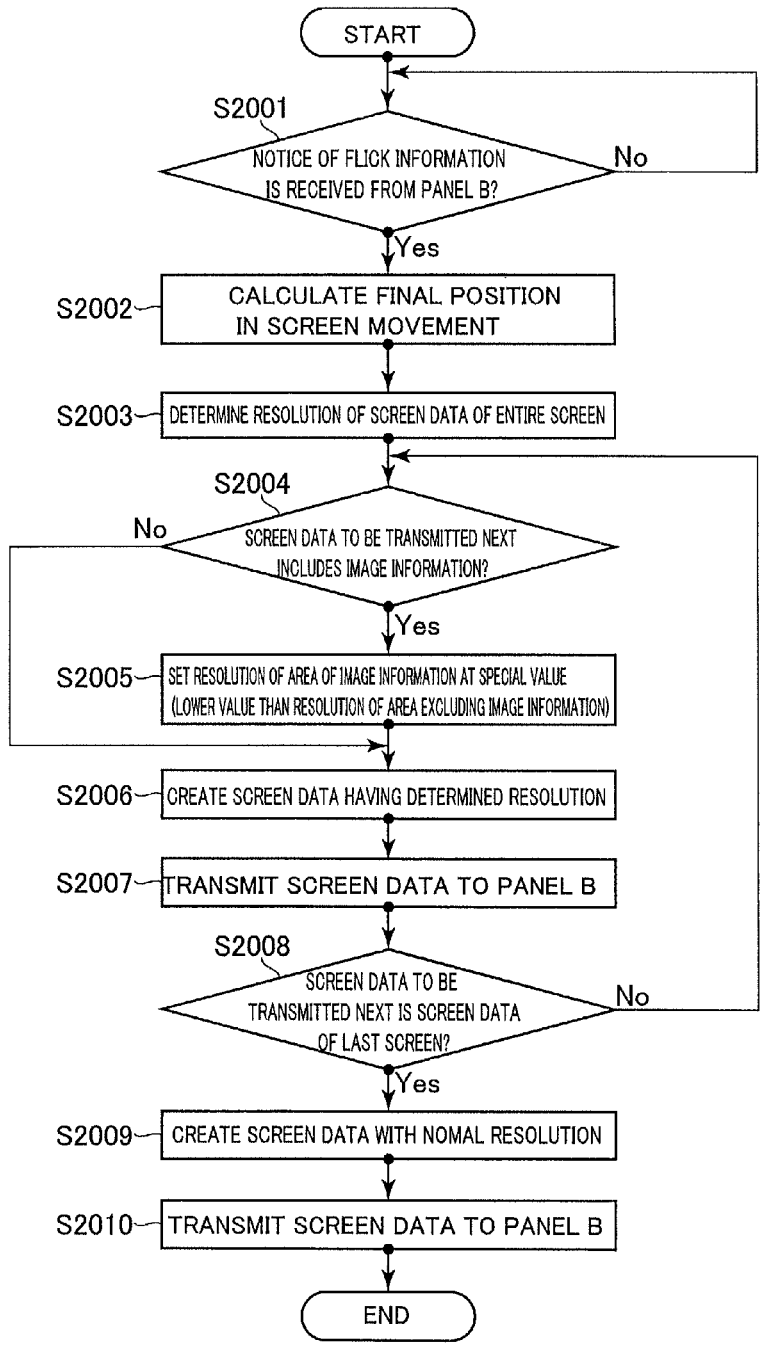
FIG. 27 is a flowchart illustrating operation of panel A in a case where flick operation is accepted on panel B in an eleventh embodiment of the present invention.

FIG. 27 is a flowchart illustrating operation of panel A in a case where flick operation is accepted on panel B in an eleventh embodiment of the present invention.

Referring to FIG. 27, in this flowchart, first, the processes in steps S2001 and S2002 that are similar to the processes in steps S201 and S202 in the flowchart in the first embodiment shown in FIG. 6 are performed.

After the process in step S2002, CPU 101 determines the resolution of image data from the start of movement to before completion of movement, for example, based on the flick speed (S2003). Next, CPU 101 determines whether image information is included in the next screen data to be transmitted from panel A to panel B (S2004).

In step S2004, if it is determined that image information is included (YES in S2004), CPU 101 partially sets the resolution of the area of the image information at a special value. Specifically, CPU 101 sets the resolution of the area of the image information lower than the resolution of the area excluding the image information (S2005). Thereafter, CPU 101 creates screen data having the resolutions determined in the processes in steps S2003 and S2005 (S2006). On the other hand, in step S2004, if it is determined that image information is not included (NO in S2004), CPU 101 proceeds to the process in step S2006.

After the process in step S2006, CPU 101 transmits the created screen data to panel B (S2007). Next, CPU 101 determines whether the screen data to be transmitted next is the screen data of the last screen (S2008).

In step S2008, if it is determined that it is the screen data of the last screen (YES in S2008), CPU 101 creates screen data having the normal resolution as the screen data of the last screen (S2009) and transmits the screen data to panel B (S2010), and then terminates the process. On the other hand, in step S2008, if it is determined that it is not the screen data of the last screen (NO in S2008), CPU 101 proceeds to the process in step S2004 and determines whether the screen data of the next screen to be transmitted from panel A to panel B includes image information (S2004).

It is noted that the operation of panels A and 13, the configuration of the display system, and the like except the foregoing description in the present embodiment are similar to those in the first or second embodiment, and therefore a description thereof will not be repeated.

According to the present embodiment, when screen data includes image information, the resolution of the area of the image information is set lower than that of the other area, thereby reducing the screen data. As a result, the responsiveness of flick operation can be improved, and the convenience and operability can be enhanced.

Twelfth Embodiment

In the present embodiment, when the screens from the start of movement to before completion of movement include major information, panel A creates screen data in which the resolution of the major information is higher than the resolution of a region other than the major information.

The major information refers to important information included in screen data. Preferably, which part in screen data is major information is registered in the screen data. For example, in a case where screen data is address data including a recipient's name and a contact such as a postal address, the recipient on the top of the list of names starting from the character "KA" may be registered as major information in the screen data. In a case where the screen data is data of a screen for job settings, the setting item on the top of a stamp item, which is a kind of items of a screen for job settings, may be registered as major information in the screen data.

Panel A determines the resolution of the major information such that the degree of reduction of resolution is smaller than that of the resolution of an area excluding the major information. Specifically, the major information has a resolution of about 70% of the original resolution, whereas the area excluding the major information has a resolution of about 40% of the original resolution.

Figure 28:
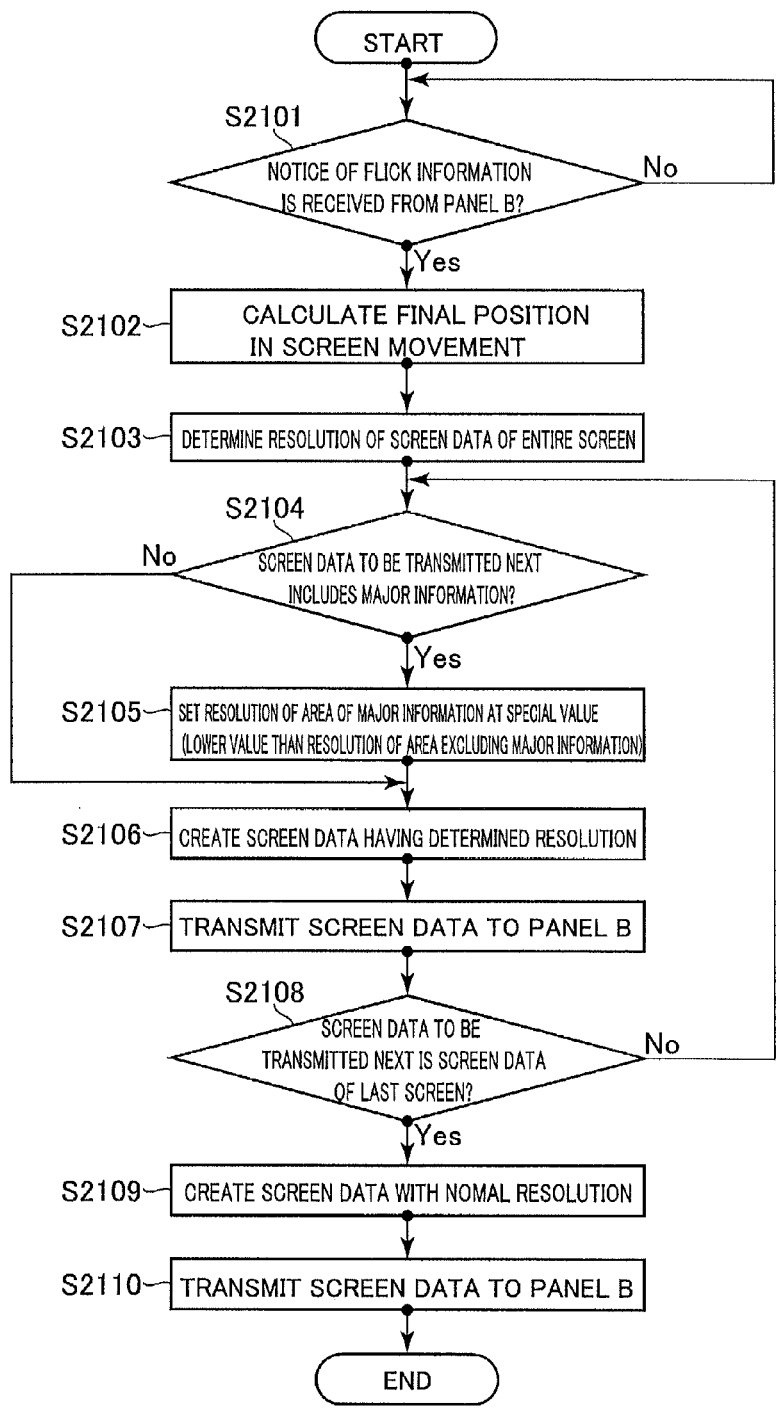
FIG. 28 is a flowchart illustrating operation of panel A in a case where flick operation is accepted on panel B in a twelfth embodiment of the present invention.

FIG. 28 is a flowchart illustrating operation of panel A in a case where flick operation is accepted on panel B in a twelfth embodiment of the present invention.

Referring to FIG. 28, in this flowchart, first, the processes in steps S2101 and S2102 that are similar to the processes in steps S201 and S202 in the flowchart in the first embodiment shown in FIG. 6 are performed.

After the process in step S2102, CPU 101 determines the resolution of the screen data from the start of movement to before completion of movement, for example, based on the flick speed (S2103). Next, CPU 101 refers to the screen data stored in fixed memory 110 and determines whether the next screen data to be transmitted from panel A to panel B includes major information (S2104).

In step S2104, if it is determined that major information is included (YES in S2104), CPU 101 partially sets the resolution of the area of the major information at a special value. More specifically, CPU 101 sets the resolution of the area of the major information higher than the resolution of the area excluding the major information (S2105). Thereafter, CPU 101 creates screen data having the resolutions determined in the processes in steps S2103 and S2105 (S2106). On the other hand, in step S2104, if it is determined that major information is not included (NO in S2104), CPU 101 proceeds to the process in step S2106.

After the process in step S2106, CPU 101 transmits the created screen data to panel B (S2107). Next, CPU 101 determines whether the screen data to be transmitted next is the screen data of the last screen (S2108).

In step S2108, if it is determined that it is the screen data of the last screen (YES in S2108), CPU 101 creates screen data having the normal resolution as the screen data of the last screen (S2109) and transmits the screen data to panel B (S2110), and then terminates the process. On the other hand, in step S2108, if it is determined that it is not the screen data of the last screen (NO in S2108), CPU 101 proceeds to the process in step S2104 and determines whether the next screen data to be transmitted from panel A to panel B includes major information (S2104).

It is noted that the operation of panels A and B, the configuration of the display system, and the like except the foregoing description in the present embodiment are similar to those in the first or second embodiment, and therefore a description thereof will not be repeated.

When screen data includes major information, if the resolution of the major information is low, the user may miss the major information. According to the present embodiment, the resolution of the area of the major information that is information the user should pay attention to is set higher than that of the other area, so that the user can easily become aware of the major information.

According to the foregoing embodiments, the display system capable of improving the user's convenience can be provided.

[Others]

The foregoing embodiments can be combined as appropriate. For example, in the second to twelfth embodiments, panel A may also display a screen of screen data stored in fixed memory 110 that is the same screen as the screen displayed by panel B (the screen of the screen data transmitted to panel B) on panel A without changing the resolution. Panel A may display screens of screen data stored in fixed memory 110, which are the screens of screen data from the start of movement to completion of movement, on panel A based on the flick information received from panel B.

The process in the foregoing embodiments may be performed by software or may be performed using a hardware circuit. A program that executes the process in the foregoing embodiments may be provided. A recording medium, such as a CD-ROM, a flexible disk, a hard disk, a ROM, a RAM, or a memory card, encoded with the program may be provided to users. The program is executed by a computer such as a CPU. The program may be downloaded to a device through a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display system including a first display device for storing screen data and a second display device for displaying a screen based on the screen data stored by said first display device, comprising:
    an operation accepting unit for accepting flick operation for requesting movement of a screen at said second display device;
    a first transmission unit for transmitting flick information concerning the flick operation accepted by said operation accepting unit to said first display device;
    a second transmission unit for successively transmitting screen data of screens from start of movement to completion of movement from said first display device to said second display device, based on said flick information; and
    a first display unit for displaying a screen based on the screen data transmitted by said second transmission unit on said second display device,
    wherein said flick information includes a touch position of a manipulator on said second display device during said flick operation, a moving direction of the manipulator on said second display device during said flick operation, a position where the manipulator is released from said second display device during said flick operation, and a touch time of the manipulator on said second display device during said flick operation.

2. The display system according to claim 1, wherein said first display device and said second display device wirelessly communicate with each other.

3. The display system according to claim 1, further comprising a second display unit for displaying screens of screen data from start of movement to completion of movement on said first display device, based on information concerning said flick operation.

4. The display system according to claim 1, further comprising:
    a processing unit configured to calculate a final screen position based on the flick information transmitted by the first transmission unit.

5. A display system including a first display device for storing screen data and a second display device for displaying a screen based on the screen data stored by said first display device, comprising:
    an operation accepting unit for accepting flick operation for requesting movement of a screen at said second display device;
    a first transmission unit for transmitting flick information concerning the flick operation accepted by said operation accepting unit to said first display device;
    a second transmission unit for successively transmitting screen data of screens from start of movement to completion of movement from said first display device to said second display device, based on said flick information;
    a first display unit for displaying a screen based on the screen data transmitted by said second transmission unit on said second display device; and
    a screen data creation unit for creating screen data having a resolution lower than a resolution of screen data stored by said first display device, as screen data from start of movement to before completion of movement,
    wherein said second transmission unit transmits the screen data created by said screen data creation unit.

6. The display system according to claim 5, further comprising:
    a speed measurement unit for measuring a flick speed based on said flick information; and
    a resolution determination unit for determining a resolution of the screen data created by said screen data creation unit, based on the flick speed measured by said speed measurement unit.

7. The display system according to claim 5, wherein said screen data creation unit creates screen data in which a resolution of a screen gradually increases with screen movement.

8. The display system according to claim 5, wherein said screen data creation unit creates screen data in which a screen having a relatively high resolution appears at regular intervals among screens having a relatively low resolution.

9. The display system according to claim 5, wherein said screen data creation unit creates screen data in which the resolution of each successive screen to be transmitted varies in accordance with a sinusoidal wave pattern.

10. The display system according to claim 5, wherein said screen data creation unit creates screen data in which a resolution in a region of a touch position on said second display device in said flick operation is higher than a resolution around a periphery of the touch position on said second display device in said flick operation.

11. The display system according to claim 5, wherein said screen data creation unit creates screen data in which a resolution at an end portion of a screen is lower than a resolution at a central position of the screen.

12. The display system according to claim 5, wherein if screens from start of movement to before completion of movement include an image, said screen data creation unit creates screen data in which the image is grayed out.

13. The display system according to claim 5, wherein if screens from start of movement to before completion of movement include an image, said screen data creation unit creates screen data in which a resolution of the image is lower than a resolution of a region excluding the image.

14. The display system according to claim 5, wherein if screens from start of movement to before completion of movement include major information, said screen data creation unit creates screen data in which a resolution of the major information is higher than a resolution of a region excluding the major information,
wherein the screen data stored by the first display device registers some information as the major information.

15. A display system including a first display device for storing screen data and a second display device for displaying a screen based on the screen data stored by said first display device, comprising:
an operation accepting unit for accepting flick operation for requesting movement of a screen at said second display device;
a first transmission unit for transmitting flick information concerning the flick operation accepted by said operation accepting unit to said first display device;
a second transmission unit for successively transmitting screen data of screens from start of movement to completion of movement from said first display device to said second display device, based on said flick information;
a first display unit for displaying a screen based on the screen data transmitted by said second transmission unit on said second display device; and
a third transmission unit for transmitting screen data of a screen on completion of movement from said first display device to said second display device, based on said flick information,
wherein said third transmission unit transmits screen data having a same resolution as a resolution of screen data stored by said first display device, as the screen data of the screen on completion of movement.

16. A display system including an image forming apparatus for storing screen data and a display device for displaying a screen based on the screen data stored by said image forming apparatus via wireless communication, comprising:
an operation accepting unit for accepting flick operation for requesting movement of a screen at said display device;
a first transmission unit for transmitting flick information concerning the flick operation accepted by said operation accepting unit to said image forming apparatus;
a second transmission unit for successively transmitting screen data of screens from start of movement to completion of movement from said image forming apparatus to said display device, based on said flick information;
a first display unit for displaying a screen based on the screen data transmitted by said second transmission unit on said display device; and
a screen data creation unit for creating screen data having a resolution lower than a resolution of screen data stored by said first display device, as screen data from start of movement to before completion of movement,
wherein said second transmission unit transmits the screen data created by said screen data creation unit.

17. A non-transitory computer-readable recording medium encoded with a control program for a display system,
said display system including a first display device for storing screen data and a second display device for displaying a screen based on the screen data stored by said first display device,
said control program causing a computer to execute processing comprising the steps of:
accepting flick operation for requesting movement of a screen at said second display device;
transmitting flick information concerning the flick operation accepted in said step of accepting to said first display device;
creating screen data having a resolution lower than a resolution of screen data stored by said first display device, as screen data from start of movement to before completion of movement;
successively transmitting the screen data created from start of movement to completion of movement from said first display device to said second display device, based on said flick information; and
displaying a screen based on the screen data transmitted in said step of transmitting screen data on said second display device.

18. A non-transitory computer-readable recording medium encoded with a control program for a display system,
said display system including an image forming apparatus for storing screen data and a display device for displaying a screen based on the screen data stored by said image forming apparatus via wireless communication,
said control program causing a computer to execute processing comprising the steps of:
accepting flick operation for requesting movement of a screen at said display device;
transmitting flick information concerning the flick operation accepted in said step of accepting to said image forming apparatus;
creating screen data having a resolution lower than a resolution of screen data stored by said image forming apparatus, as screen data from start of movement to before completion of movement;
successively transmitting the screen data created from start of movement to completion of movement from said image forming apparatus to said display device, based on said flick information; and
displaying a screen based on the screen data transmitted in said step of transmitting screen data on said display device.

19. A display device comprising a storage unit for storing screen data, further comprising:
a reception unit for receiving flick information concerning flick operation for requesting movement of a screen from another display device;
a transmission unit for successively transmitting screen data of screens from start of movement to completion of movement that is stored in said storage unit, to said another display device, based on said flick information; and
a screen data creation unit for creating screen data having a resolution lower than a resolution of screen data stored by said display device, as screen data from start of movement to before completion of movement,
wherein said transmission unit transmits the screen data created by said screen data creation unit.

20. A first display device comprising:
an operation accepting unit for accepting flick operation for requesting movement of a screen;

a transmission unit for transmitting flick information concerning the flick operation accepted by said operation accepting unit to a second display device;

a reception unit for successively receiving screen data created by said second display device and successively transmitted by said second display device from start of movement to completion of movement based on said flick information from said second display device; and a display unit of said first display device for enlarging a screen of the screen data received by said reception unit to a size of a display screen of said first display device, and displaying the enlarged screen, wherein said received screen data from said second display device has a resolution lower than a resolution of screen data stored by said second display device.

* * * * *